(12) United States Patent
Kasai et al.

(10) Patent No.: US 6,627,859 B1
(45) Date of Patent: Sep. 30, 2003

(54) METHOD AND APPARATUS FOR TEMPERATURE CONTROL OF HEATER

(75) Inventors: Shigeru Kasai, Yamanashi (JP); Naoto Ikeda, Lahore (PK)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 09/857,849

(22) PCT Filed: Dec. 13, 1999

(86) PCT No.: PCT/JP99/06972

§ 371 (c)(1),
(2), (4) Date: Jun. 11, 2001

(87) PCT Pub. No.: WO00/36877

PCT Pub. Date: Jun. 22, 2000

(30) Foreign Application Priority Data

Dec. 14, 1998 (JP) .......................................... 10-375317
Nov. 30, 1999 (JP) .......................................... 11-340059

(51) Int. Cl.$^7$ ................................ H05B 3/02; H05B 1/02
(52) U.S. Cl. .................................... 219/505; 219/438
(58) Field of Search ................................ 219/482, 483, 219/484, 497, 504, 505, 444.1, 448.11, 448.12; 323/235, 236, 237

(56) References Cited

U.S. PATENT DOCUMENTS

| 4,086,466 A | * | 4/1978 | Scharlack ................... 219/494 |
| 4,394,564 A | * | 7/1983 | Dills ....................... 219/448.17 |
| 4,786,799 A | * | 11/1988 | Welle et al. ................. 219/486 |
| 5,111,792 A | * | 5/1992 | Nagai et al. ................. 123/685 |
| 5,120,936 A | * | 6/1992 | Shyu et al. ................... 219/497 |
| 5,294,778 A | * | 3/1994 | Carman et al. ................ 219/385 |
| 5,635,093 A | * | 6/1997 | Arena et al. ............... 219/444.1 |
| 6,469,283 B1 | * | 10/2002 | Burkhart et al. ............. 219/486 |

FOREIGN PATENT DOCUMENTS

| JP | 52-28763 | 8/1950 |
| JP | 57-020818 | 2/1982 |
| JP | 02-296273 | 12/1990 |
| JP | 04-067587 | 3/1992 |
| JP | 4-78796 | 7/1992 |
| JP | 07-160132 | 6/1995 |

\* cited by examiner

*Primary Examiner*—Sang Paik
(74) *Attorney, Agent, or Firm*—Finnegan, Henderson, Farabow, Garrett & Dunner L.L.P.

(57) ABSTRACT

A CVD device (100) includes a 142 process chamber (102), in the wall of which first to fourth cartridge heaters (146, 148, 150, 152) are buried. The heaters have resistance whose value increases with temperature. A heater controller (160) determines the heater resistance from the current and voltage values associated with each heater. The heater controller (160) corrects a reference resistance corresponding to a set temperature by using a correction value corresponding to the temperature detected by a temperature sensor (250), and multiplies the corrected reference resistance by the temperature distribution constant of each heater to determine the target resistance. The heater controller (160) properly controls the phase of the AC power supplied to each heater so that the heater resistance may follow the target resistance. The first to fourth cartridge heaters (146, 148, 150, 152) are thus controlled accurately.

28 Claims, 14 Drawing Sheets

LOW TEMPERATURE

SPECIFIC TEMPERATURE

HIGH TEMPERATURE

LOW TEMPERATURE

SPECIFIC TEMPERATURE

HIGH TEMPERATURE

LOW TEMPERATURE

SPECIFIC TEMPERATURE

HIGH TEMPERATURE

METHOD AND APPARATUS FOR TEMPERATURE CONTROL OF HEATER

TECHNICAL FIELD

The present invention relates to an apparatus and method for implementing temperature control on a means for heating.

BACKGROUND ART

Various types of semiconductor manufacturing apparatuses having a heater are used in the process of manufacturing a semiconductor device. For instance, heaters are provided at a process chamber wall, a stage on which a semiconductor wafer (hereafter referred to as a "wafer") is placed and the like in a thermal CVD (film forming) device. Thus, in the thermal CVD device, film formation processing is implemented after heating the process chamber wall and the stage to a specific temperature with the heaters. In addition, temperature control of the heaters is implemented by a temperature control apparatus. The temperature control apparatus compares the set temperature and the temperature at a heater detected by a thermal (temperature) sensor. Then, the temperature control apparatus implements on/off control of the power supplied to the heater through switching so as to set the two temperatures roughly equal to each other through an adjustment of the quantity of heat generated by the heater. In addition, an interlocking thermal sensor (hereafter referred to as an "interlock sensor") is connected to the temperature control apparatus. The temperature control apparatus stops power supply to a heater if the temperature of the heater detected by the interlock sensor indicates a level equal to or higher than the temperature upper limit set at the temperature control apparatus.

However, in the prior art described above, it is necessary to provide a thermal sensor and an interlock sensor in correspondence to each heater. For this reason, if there are a plurality of heaters, the number of individual types of sensors and the wirings required to connect the sensors to the temperature control apparatus are bound to increase in correspondence to the number of heaters. As a result, a problem arises in the prior art in that a large initial cost must be incurred since a great number of sensors must be provided.

In addition, there is another problem in the prior art technology in that the maintainability of the apparatus is lowered due to the complex and time-consuming inspection and testing process that must be conducted on the sensors and the wirings.

In the prior art, the apparatus is bound to be large because of the large numbers of sensors and wirings. Consequently, there is a problem in that the technological requirement for miniaturizing devices such as the CVD device provided in the clean room cannot be met.

Furthermore, the temperature at a heater cannot be directly detected in the prior art. Thus, the heater temperature cannot be ascertained accurately, to lead to a problem of unstable heater temperature control.

In the prior art technology, even when heating a single member by using a plurality of heaters, the temperatures at the individual heaters are sustained at levels roughly equal to one another regardless of the positions at which the heaters are installed. As a result, mutual interference occurs between the heat generated at a given heater and the heat generated at another heater, thereby presenting a problem in that uniformity is not achieved with regard to the temperature of the member.

Moreover, the temperature of a heater is adjusted by supplying power at a specific level to the heater through on/off control implemented on the power in the prior art. This results in a problem in that accurate temperature control cannot be achieved since there is a great difference in the heater temperature when power is on and the heater temperature when power is off and the heater temperature is not sustained at a constant level.

The object of the present invention, which has been completed by addressing the problems of the prior art discussed above, is to provide a new and improved apparatus and a new and improved method for implementing temperature control on a means for heating, that solve the problems discussed above and other problems as well.

DISCLOSURE OF THE INVENTION

In order to achieve the object described above, in a first aspect of the, present invention, a temperature control apparatus that implements temperature control on a means for heating which heats an object to be heated, comprising at least two means for heating each with the resistance thereof increasing as the temperature rises, at least one means for temperature detection that detects the temperature of the object to be heated, a means for target resistance calculation that calculates a target resistance for each of the means for heating by correcting a reference resistance determined based upon the set temperature for the object to be heated with a correction value obtained in correspondence to the temperature detected by the means for temperature detection and multiplying the corrected reference resistance by a temperature distribution constant that is determined in advance for each means for heating to adjust the temperature distribution at the object to be heated, a means for actual resistance calculation that determines the actual resistance at each of the means for heating based upon a feedback voltage value obtained based upon the voltage applied to the means for heating and a feedback current value obtained based upon the current flowing through the means for heating and, a means for power control that controls the power applied to each means for heating so that the actual resistance at the means for heating conforms to the target resistance, is provided.

According to the present invention, means for heating each having a resistance that increases in proportion to an increase in temperature are utilized. As a result, the temperature at each means for heating can be ascertained based upon the actual resistance determined in correspondence to the feedback voltage value and the feedback current value obtained from the means for heating. Thus, the need for providing a means for temperature detection that detects the temperature at a means for heating and a means for connection such as a wiring that connects the means for temperature detection to the temperature control device for each means for heating is eliminated. Consequently, even when heating the object to be heated by utilizing a plurality of means for heating, the initial cost can be minimized and, at the same time, the maintenance work is facilitated. Furthermore, since the temperature at each means for heating can be directly detected, accurate and stable temperature control can be implemented on the means for heating.

In addition, according to the present invention, the reference resistance used as the reference value when implementing control on each means for heating is corrected by using a correction value obtained in correspondence to the temperature detected by the means for temperature detection. By adopting such a structure, it becomes possible to control each means for heating based upon the actual temperature of the object to be heated as well as based upon the set temperature, is provided. As a result, even more accurate temperature control on the individual means for heating is achieved to set the temperature of the object to be heated even closer to the set temperature. Furthermore, according to the present invention, the target resistance is obtained by multiplying the corrected reference resistance by a temperature distribution constant that is provided to adjust the temperature distribution of the object to be heated. When such a target resistance is adopted, the temperatures of the means for heating can be adjusted in conformance to the temperature levels at the individual portions of the object to be heated. Thus, the temperature of the object to be heated can be maintained in an even more consistent manner. Moreover, the ratio of the temperatures of the individual means for heating can be adjusted so as to achieve uniformity in the temperature of the entire object to be heated in this structure. As a result, accurate temperature management is achieved for the object to be heated. The actual resistance at each means for heating is calculated by the means for actual resistance calculation. Consequently, the change in the value of each actual resistance can be ascertained almost concurrently while the change in the temperature at the corresponding means for heating is detected. Thus, an improvement in the response of the means for heating is achieved.

It is desirable to employ a means for phase control that implements phase control on the power applied to the individual means for heating as the means for power control. In such a structure, by changing the phase of the AC power applied to the means for heating as appropriate, the temperatures at the means for heating can be adjusted. As a result, finer control on the means for heating is achieved compared to on/off power control implemented through a means for interruption such as a switch. Consequently, the temperature of the object to be heated is stabilized.

Through the means for phase control, the length of time over which power is applied should be increased if the actual resistance is lower than the target resistance, the current length of power application should be sustained if the actual resistance is essentially equal to the target resistance and the length of time over which power is applied should be reduced if the actual resistance is higher than the target resistance, to achieve a prompt and reliable adjustment of the temperature of the means for heating.

Alternatively, it is desirable to employ a means for zero cross control that implements zero cross control on the power applied to the individual means for heating as the means for power control. In this structure in which power on/off is implemented when the voltage is at zero, noise occurs less readily in the power. As a result, the power is supplied to the means for heating in a stable manner, to further stabilize the temperature of the means for heating.

As a further alternative, the means for power control may be constituted of a means for linear control that implements linear control on the power applied to the means for heating. By adopting such a structure, the power can be controlled continuously. As a result, better control is achieved on each of the means for heating. Furthermore, since noise does not occur readily in the power, stable temperature control is achieved.

It is desirable to connect a means for power supply suspension that suspends the power supply to a means for heating if the actual resistance becomes higher than a resistance upper limit or becomes lower than a resistance lower limit. By adopting such a structure, it becomes possible to detect an error at a means for heating or the like based upon the individual resistance values. Thus, the need for providing a means for temperature detection that detects an abnormality in the temperature and a wiring for connecting the means for temperature detection to the temperature control apparatus is eliminated. As a result, a further reduction in the initial cost and a further improvement in the maintainability are achieved.

The present invention achieves particularly outstanding advantages when adopted in an application in which the object to be heated is a member constituting a semiconductor manufacturing apparatus or the like. In the process for manufacturing a semiconductor device, more accurate temperature control must be achieved in order to support ultra-miniaturization and ultra-high integration of the semiconductor device. Thus, by adopting the present invention in the temperature control of the member that needs to be heated, a higher degree of accuracy in temperature control is achieved. In addition, a semiconductor manufacturing apparatus or the like is often installed in a clean room. Accordingly, by employing the means for heating and the temperature control apparatus in a semiconductor manufacturing apparatus and the like, miniaturization of the apparatus can be achieved since the numbers of various means for temperature detection and the numbers of the means for connection are reduced. As a result, the space inside the clean room can be utilized efficiently or the size of the clean room itself can be reduced. It is to be noted that the semiconductor manufacturing apparatus and the like in this context includes all the devices used during the semiconductor manufacturing process such as various devices connected to the semiconductor manufacturing apparatus as well as the semiconductor manufacturing apparatus itself.

In a second aspect of the present invention, a temperature control apparatus that implements temperature control on a means for heating which heats an object to be heated, comprising at least two means for heating each with the resistance thereof increasing as the temperature rises, at least one means for temperature detection that detects the temperature of the object to be heated, a means for target voltage calculation that calculates a target voltage for each of the means for heating by correcting a reference voltage determined based upon the set temperature for the object to be heated with a correction value obtained in correspondence to the temperature detected by the means for temperature detection and multiplying the corrected reference resistance by a temperature distribution constant that is determined in advance for each means for heating to adjust the temperature distribution at the object to be heated, a means for voltage detection that detects the actual voltage applied to each of the means for heating and, a means for power control that controls the power applied to each means for heating so that the actual voltage at the means for heating conforms to the target voltage, is provided.

According to the present invention, each means for heating is controlled based upon the target voltage value and the actual voltage.

The actual voltage can be obtained by detecting the voltage applied to the means for heating without having to perform any arithmetic operation. As a result, it is not necessary to provide a means for actual voltage calculation or to implement an arithmetic operation step to calculate the actual voltage, thereby achieving simplification of the apparatus configuration and also simplification of the control process.

As in the first aspect of the invention, it is desirable to employ a means for phase control that implements phase control on the power applied to the individual means for heating as the means for power control. As in the first aspect of the invention, through the means for phase control, the length of time over which power is applied should be increased if the actual voltage is lower than the target voltage, the current length of power application should be sustained if the actual voltage is essentially equal to the target resistance and the length of time over which power is applied should be reduced if the actual voltage is higher than the target voltage.

As a desirable alternative, the means for power control may be constituted of a means for zero cross control that implements zero cross control on the power applied to each means for heating or a means for linear control that implements linear control on the power applied to each means for heating, as explained in reference to the first aspect of the invention.

As in the first aspect of the invention, it is desirable to connect a means for power supply suspension that suspends the power supply to a means for heating if the actual voltage becomes higher than the voltage upper limit or becomes lower than the voltage lower limit.

In addition, it is desirable to adopt the present invention in an application in which the object to be heated is a member constituting a semiconductor manufacturing apparatus and the like, as explained in reference to the first aspect of the invention.

In a third aspect of the present invention, a temperature control method to be implemented on a means for heating that heats an object to be heated comprising a step in which a reference resistance determined based upon the set temperature for the object to be heated is corrected by using a correction value obtained in correspondence to the temperature at the object to be heated detected by, at least, one means for temperature detection, a step in which the corrected reference resistance is multiplied by a temperature distribution constant used to adjust the temperature distribution of the object to be heated, which is determined in advance for each of at least two means for heating each with a resistance that increases in correspondence to a temperature increase, to obtain a target resistance for each of the means for heating, a step in which the actual resistance at each of the means for heating is ascertained based upon a feedback voltage which corresponds to the voltage applied to each means for heating and a feedback current value which corresponds to the current flowing through the means for heating and a step in which the power applied to each of the means for heating is controlled so that the actual resistance at the means for heating conforms to the target resistance, is provided.

In this method, the resistance at each means for heating increases as the temperature of the means for heating increases. As a result, as in the first aspect of the invention, temperature control on each means for heating is implemented based upon the corresponding actual resistance determined in conformance to the feedback voltage and the feedback current at the means for heating. Consequently, accurate temperature management is achieved for each means for heating. In addition, according to the present invention, the reference resistance is corrected based upon the detected temperature, as in the invention disclosed in claim 1. Thus, more accurate temperature control is achieved. Furthermore, the target resistance is obtained by multiplying the corrected reference resistance by a temperature distribution constant. Thus, even when heating the object to be heated with a plurality of means for heating, a consistent temperature distribution is achieved at the object to be heated in conformance to the current state of the object to be heated, as in the invention disclosed in claim 1.

It is desirable that in the step for power control, phase control is implemented on the power applied to each means for heating. By adopting such a method, the temperatures of the means for heating are adjusted through phase control as explained in reference to the previous aspects of the invention. As a result, the temperatures at the means for heating can be set with a high degree of accuracy.

Furthermore, it is desirable that the step in which phase control is implemented on the power include a step in which the length of time over which power is applied is increased if the actual resistance is smaller than the target resistance, a step in which the current length of power application is sustained if the actual resistance is essentially equal to the target resistance and a step in which the length of time over which power is applied is reduced if the actual resistance is higher than the target resistance. Through this method, the object to be heated can be set at a specific temperature with a high degree of reliability, as in the first aspect of the invention.

Alternatively, in the step for power control, zero cross control may be implemented on the power applied to each means for heating.

By adopting this method, it is ensured that noise is less likely to occur in the power applied to the means for heating, as in the previous aspect of the invention. As a result, power at a specific level is supplied in a stable manner.

As a desirable alternative, linear control may be implemented on the power supplied to each means for heating in the step for power control. Through such a method, the power can be controlled continuously, as in the previous aspects of the invention. As a result, better control is achieved.

Moreover, it is desirable to include a step in which the power supply to a means for heating is suspended if the actual resistance becomes higher than the resistance upper limit or the actual resistance becomes lower than the resistance lower limit. By adopting this method, an error at the means for heating can be detected based upon the actual resistance without having to provide a means for temperature detection that detects a temperature abnormality at the means for heating, as explained earlier in reference to the first aspect of invention. Thus, damage to the object to be heated and the like can be prevented.

Also, it is desirable that the object to be heated is a member constituting a semiconductor manufacturing apparatus and the like. In such a case, the temperature control on the semiconductor manufacturing apparatus and the like can be implemented in an ideal state, as in the previous aspects of the invention.

In a fourth aspect of the present invention, a temperature control method to be implemented on a means for heating that heats an object to be heated comprising a step in which a reference voltage determined based upon the set temperature for the object to be heated is corrected by using a correction value obtained in correspondence to the temperature of the object to be heated detected by, at least, one means for temperature detection, a step in which the corrected reference voltage is multiplied by a temperature distribution constant used to adjust the temperature distribution of the object to be heated, which is determined in advance for each of at least two means for heating each with a resistance that increases in correspondence to a temperature increase to obtain a target voltage for each of the means for heating, a step in which the actual voltage applied to each of the means for heating is detected and a step in which the power applied to each means for heating is controlled so that the actual voltage at the means for heating conforms to the target voltage, is provided.

According to the present invention, each means for heating is controlled by using the corresponding actual voltage detected at the means for heating, as in the second aspect of the invention. Thus, it is not necessary to provide a means for actual voltage calculation or to implement an arithmetic operation step to calculate the actual voltage, to achieve simplification in the apparatus structure and simplification in the control process.

As in the preceding aspects of the invention, it is desirable that in the step for power control, phase control is implemented on the power applied to each means for heating. As in the preceding aspects of the invention, it is desirable that the step in which phase control is implemented on the power include a step in which the length of time over which power is applied is increased if the actual voltage is lower than the target voltage, a step in which the current length of power application time is sustained if the actual voltage is essentially equal to the target voltage and a step in which the length of time over which power is applied is reduced if the actual voltage is higher than the target voltage.

As an alternative, in the power control step, zero cross control may be implemented on the power applied to each means for heating or linear control may be implemented on the power applied to each means for heating, as in the preceding aspect of the invention.

As in the preceding aspects of the invention, it is desirable to include a step in which power supply to a means for heating is suspended if the actual voltage becomes higher than the voltage upper limit or the actual voltage becomes lower than the voltage lower limit.

As in the preceding aspects of the invention, it is desirable that the object to be heated is a member constituting a semiconductor manufacturing apparatus and the like.

BEST MODE FOR CARRYING OUT THE INVENTION

The following is an explanation of preferred embodiments of the apparatus and the method for implementing temperature control on a means for heating adopted in a heater controller employed in conjunction with heaters provided in a thermal CVD device. It is to be noted that the same reference numbers are assigned to components having functions and structural features essentially identical to one another in the individual embodiments, to preclude the necessity for the repeated explanation thereof.

First Embodiment

This embodiment is characterized in that temperature control on a plurality of heaters is implemented based upon the resistances at the individual heaters. The following is a detailed explanation of a temperature control apparatus and a temperature control method that are employed to implement this temperature control.

(1) Structure of CVD Device

Figure 1:
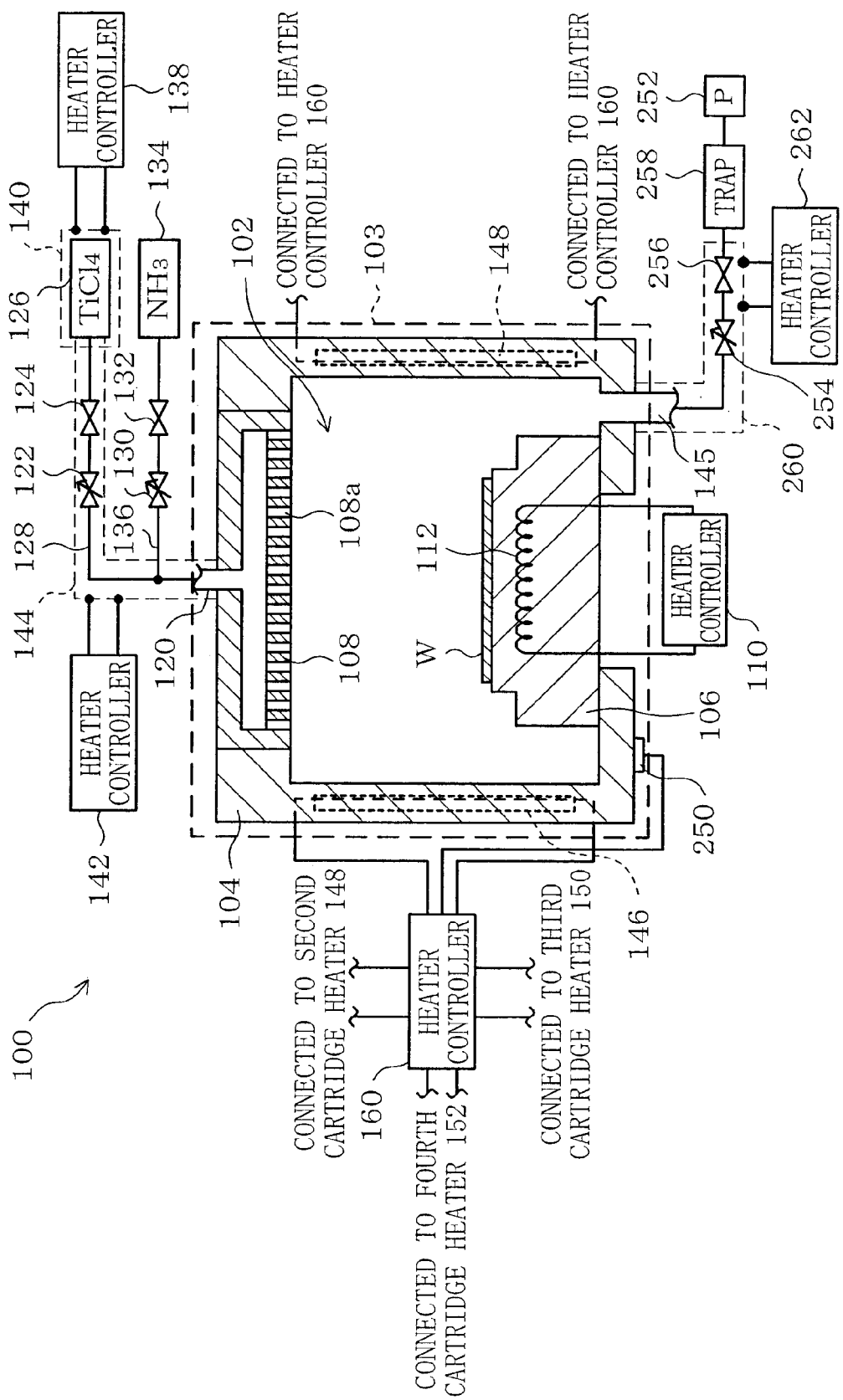
FIG. 1 is a sectional view schematically illustrating a CVD device which may adopt the present invention.
Figure 2:
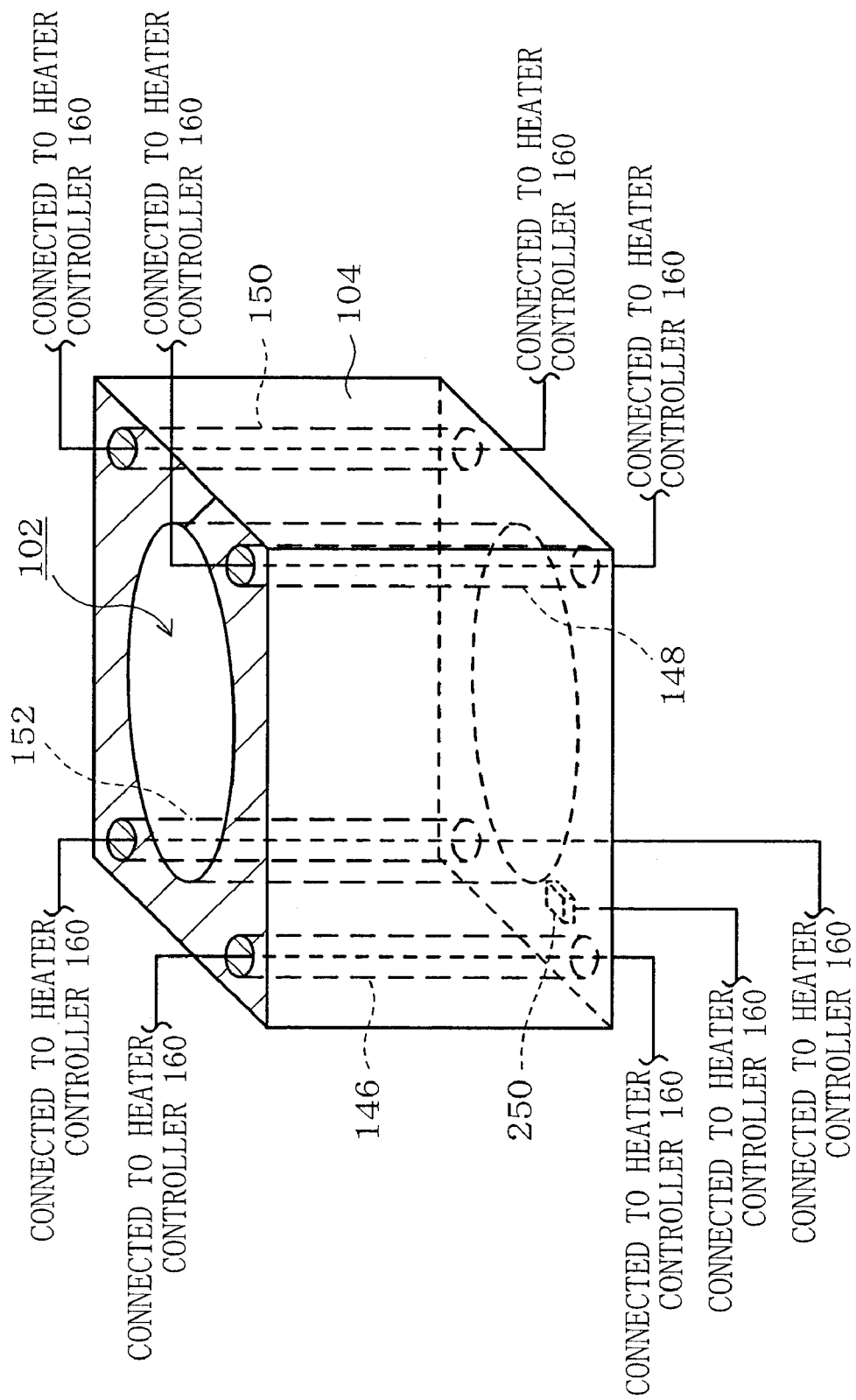
FIG. 2 is a perspective schematically illustrating the positions of cartridge heaters provided in the CVD device shown in FIG. 1.

First, in reference to FIGS. 1 and 2, the structure of a CVD device 100, in which the present invention may be adopted is explained. A process chamber 102 in the CVD device 100 shown in FIG. 1 is formed within an airtight and conductive process container 104. In addition, the process container 104 is covered with a heat insulating material 103. In the wall of the process chamber 102, first~fourth cartridge heaters 146, 148, 150 and 152 are mounted, as shown in FIGS. 1 and 2. The first~fourth cartridge heaters 146, 148, 150 and 152 are structured essentially identical to one another and are each connected to a heater controller 160. In addition, at the outer wall surface of the process chamber 102, a temperature sensor 250 is provided. The temperature sensor 250 is connected to a temperature control device 164 constituting the heater controller 160, which is to be detailed later. The temperature sensor 250 is installed at a position at which it can detect the temperature at the inner wall surface of the process chamber 102 with a high degree of sensitivity and the temperature of the member changes greatly, e.g., at the outer wall surface at the bottom of the process chamber 102.

As shown in FIG. 1, a stage 106 and a gas outlet member 108 are provided facing opposite each other inside the process chamber 102. The stage 106 is structured so that a wafer W can be placed on it. In addition, the stage 106 is internally provided with a resistance heater 112. A heater controller 110 is connected to the resistance heater 112.

Numerous gas outlet holes 108a are formed at the gas outlet member 108. For this reason, the gas outlet member 108 assumes a so-called showerhead structure. The gas outlet holes 108a communicate between a gas supply pipe 120 and the process chamber 102. A branch pipe 128 and a branch pipe 136 are connected to the gas supply pipe 120.

A gas supply source 126 is connected to the branch pipe 128 via a flow-regulating valve 122 and a switching valve 124. The branch pipe 136 is connected with a gas supply source 134 via a flow-regulating valve 130 and a switching valve 132. The gas supply source 126 is enclosed by a mantle heater (silicon rubber heater) 140. The mantle heater 140 is connected to a heater controller 138. Furthermore, the branch pipe 128 and the gas supply pipe 120 are covered by a mantle heater 144. The mantle heater 144 is connected to a heater controller 142. The mantle heaters 140 and 144 are covered with a heat insulating material (not shown).

A vacuum pump 252 is connected to the process chamber 102 via an evacuating pipe 145. In addition, an evacuation-quantity regulating valve 254, a switching valve 256 and a trap 258 are mounted at the evacuating pipe 145. The trap 258 is structured so that it is capable of liquefying a liquefiable gas evacuated from the process chamber 102 and collecting the liquefied gas. Furthermore, the evacuating pipe 145 is enclosed by a mantle heater 260. The mantle heater 260 is connected with a heater controller 262. The mantle heater 260 is covered with a heat insulating material (not shown).

Next, in reference to FIG. 1, film formation processing performed at the CVD device 100 is explained. First, the heater controllers 110, 138, 142, 262 and 160 implement control on the corresponding resistance heater 112, mantle heaters 140, 144 and 260 and first~fourth cartridge heaters 146, 148, 150 and 152 as appropriate. Through such control, the stage 106 is heated to a temperature within a range of, for instance, 400° C.~600° C. In addition, the wall of the process chamber 102 is heated to, for instance, 150° C. The gas supply source 126 is heated to, for instance, 90° C. and the branch pipe 128 and the evacuating pipe 145 are heated to, for instance, 150° C. As a result, a liquid or solid raw material stored in the gas supply source 126, e.g., $TiCl_4$ (titanium tetra-chloride) which is in a liquid state at normal temperature, becomes gasified. In addition, it becomes possible to supply $TiCl_4$ into the process chamber 102 while $TiCl_4$ remains in a gasified state via the gas supply pipe 128 and the like. The gas evacuated from the process chamber 102 travels through the evacuating pipe 145 without becoming liquefied and is induced into the trap 258.

Next, the wafer W is placed on the stage 106. In addition, gasified $TiCl_4$ and $NH_3$ (ammonia) are induced into the process chamber 102 from the gas supply sources 126 and 134. The gas (atmosphere) within the process chamber 102 is evacuated by the vacuum pump 252. By inducing and evacuating the processing gas in this manner, the atmosphere within the process chamber 102 is set at a specific pressure level. As a result, a TiN (titanium nitride) film is formed on the wafer W with the processing gas induced into the process chamber 102.

(2) Structures of Heaters

Next, the structures of the individual heaters provided in the CVD device 100 are explained. It is to be noted that the structures assumed by the heating elements at the resistance heater 112, the mantle heaters 140, 144 and 260 and the first~fourth cartridge heaters 146, 148, 150 and 152 are essentially identical to one another. Accordingly, an explanation is given below on the structure of the first cartridge heater 146 as a typical example.

Figure 3:
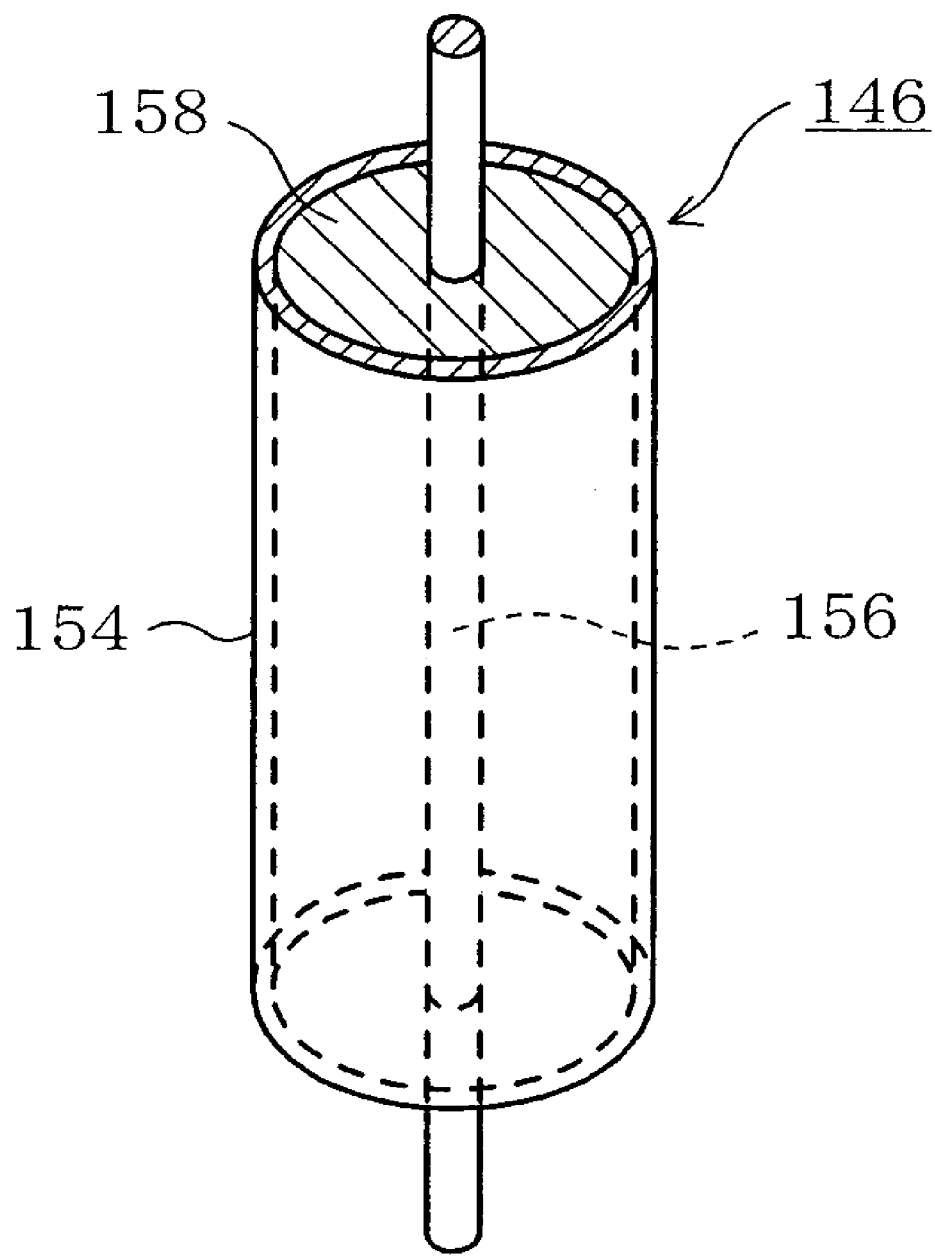
FIG. 3 is a perspective schematically illustrating the structure of a cartridge heater provided in the CVD device shown in FIG. 1.

The first cartridge heater 146 shown in FIG. 3 comprises a cylindrical body 154 which may be constituted of, for instance, stainless steel, a heating wire 156 and a filler material 158 which may be constituted of, for instance, MgO (magnesium oxide). The heating wire 156 is set at an approximate center inside the cylindrical body 154. In addition, the filler material 158 is provided to fill the space between the heating wire 156 and the inner wall surface of the cylindrical body 154.

The heating wire 156 is constituted of an alloy containing Fe (iron) and more preferably an alloy constituted of Fe and Ni (nickel) (hereafter referred to as an "Fe-Ni alloy"). The Fe-Ni alloy demonstrates characteristics whereby the resistance increases greatly in proportion to a rise in the temperature, compared to an alloy (Nichrome) constituted of Ni and Cr (chrome) often utilized to constitute the heating elements of heaters in the prior art, and W (tungsten), Pt (platinum) and Ta (tantalum) in FIG. 4. Thus, the resistance of the heating wire 156 constituted of this material increases in correspondence to a rise in the temperature resulting from AC power application, as explained later. If, on the other hand, the AC power application is suspended and the temperature becomes lowered, the resistance of the heating wire 156, too, becomes reduced.

Thus, the temperature of the first cartridge heater 146 can be detected based upon the resistance of the heating wire 156 itself. As a result, the temperature can be detected with a high degree of accuracy. In addition, by adopting this structure, the number of temperature sensors and the number of wirings and the like connected to the sensors can be reduced. Consequently, the maintenance work is facilitated and initial cost can be reduced and the CVD device 100 can be minimized. It is to be noted that heating elements constituted of the Fe-Ni alloy are also used in the second~fourth cartridge heaters 148, 150 and 152, the resistance heater 112 and the mantle heaters 140, 144 and 260 as well. Effects and advantages identical to those achieved in the first cartridge heater 146 are also achieved in the second~fourth cartridge heaters 148, 150 and 152, the resistance heater 112 and the mantle heaters 140, 144 and 260, as a result. Furthermore, the heating element may be also adopted in a sheathed heater.

(3) Structures of Heater Controllers (a) Overall Structures of Heater Controllers Next, the structures of the heater controllers provided in the CVD device 100 are explained. Since the heater controllers 110, 138, 142, 160 and 262 are structured identically to one another, an explanation is given below on the heater controller 160 as a typical example.

Figure 5:
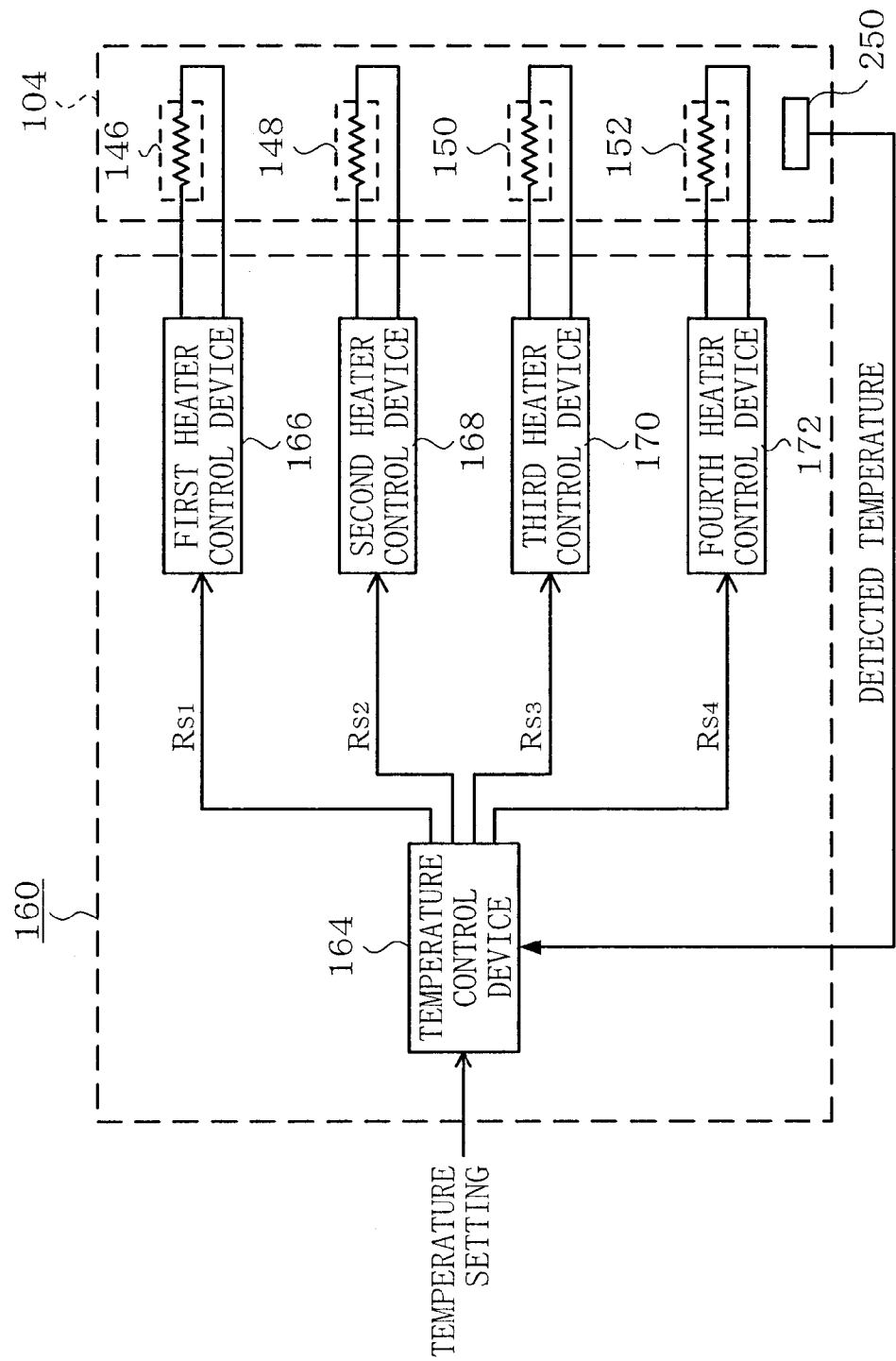
FIG. 5 is a schematic block diagram of the heater controller shown in FIG. 1.

The heater controller 160 comprises the temperature control device 164 and first~fourth heater control devices 166, 168, 170 and 172, as illustrated in FIG. 5. The first~fourth heater control devices 166, 168, 170 and 172, which are structured identically to one another, are each connected to the temperature control device 164. In addition, the first~fourth heater control devices 166, 168, 170 and 172 are respectively connected with the first~fourth cartridge heaters 146, 148, 150 and 152. The temperature sensor 250 described earlier is connected to the temperature control device 164.

When the required temperature at the wall of the process chamber 102 (hereafter referred to as the "set temperature") is set, the temperature control device 164 calculates a reference resistance in correspondence to the set temperature. The set temperature should be a temperature at a level at which no deposition adheres to the inner wall surface of the process chamber 102 during the film formation processing, e.g., 150° C. In addition, the reference of resistance is a value (a constant value) which is determined based upon the relationship between the temperature and the resistance at the heating wire 156 shown in FIG. 4 explained earlier. Consequently, when the temperatures of the first~fourth cartridge heaters 146, 148, 150 and 152 (the temperature of the heating wire 156) are set at 150° C. which is equal to the set temperature, for instance, the reference resistance is approximately 90.29Ω. However, in fact, there are inconsistencies among individual cartridge heater products. For this reason, the reference resistance is determined for each cartridge heater in actual application.

In addition, the temperature control device 164 obtains a correction value as necessary based upon the temperature at the wall of the process chamber 102 detected by the temperature sensor 250. The correction value is used to correct as necessary a reference resistance (a constant value) so as to set the temperature at the wall of the process chamber 102 equal to the set temperature at all times based upon the difference between the set temperature and the temperature at the wall of the process chamber 102 during the control operation. If there is a difference between the set temperature and the temperature at the wall of the process chamber 102, the temperature control device 164 corrects the reference resistance by using the correction value to obtain a corrected reference resistance. Accordingly, if there is a difference between the set temperature and the temperature at the wall of the process chamber 102, the corrected reference resistance changes in correspondence to the temperature difference. In addition, if the temperature at the wall of the process chamber 102 is equal to the set temperature, the corrected reference resistance is equal to the reference resistance. It is to be noted that in this specification, the reference resistance used to obtain target resistances $R_{s1}$, $R_{s2}$, $R_{s3}$ and $R_{s4}$ to be detailed later is referred to as a corrected reference resistance even when there is no difference between the set temperature and the temperature at the wall of the process chamber 102 and thus, the reference resistance is not corrected. By assuming the structure described above, the temperature control on the first~fourth cartridge heaters 146, 148, 150 and 152 can be implemented with an even higher degree of accuracy.

The temperature control device 164 also calculates the target resistances $R_{s1}$, $R_{s2}$, $R_{s3}$ and $R_{s4}$ by multiplying the corrected reference resistances by temperature distribution constants $K_1$, $K_{s2}$, $K_3$ and $K_4$ respectively. The temperature distribution constants $K_1$, $K_{s2}$, $K_3$ and $K_4$ are used to determine the temperature distributions at positions (installation locations) at which heat is applied by the first~fourth cartridge heaters 146, 148, 150 and 152 respectively so as to adjust the temperature over the entire inner wall surface of the process chamber 102 consistently at the set temperature in the embodiment. In addition, the temperature distribution constants $K_1$, $K_{s2}$, $K_3$ and $K_4$ are also used to correct any errors in the quantities of heat generated by the first~fourth cartridge heaters 146, 148, 150 and 152. For these purposes, the temperature distribution constants $K_1$, $K_{s2}$, $K_3$ and $K_4$ are individually determined in advance in correspondence to the first~fourth cartridge heaters 146, 148, 150 and 152 respectively.

Now, a method through which the temperature distribution constants $K_1$, $K_2$, $K_3$ and $K_4$ are obtained is explained. First, prior to the actual processing, a temperature sensor is set at each of the positions at which heat is applied by the first~fourth cartridge heaters 146, 148, 150 and 152. The individual temperature sensors are structured essentially identical to the temperature sensor 250. The temperature sensors are mounted at positions at which they can detect changes in the temperatures of the first~fourth cartridge heaters 146, 148, 150 and 152 with a high degree of sensitivity. After the temperature sensors are mounted, control is implemented by the first~fourth heater control devices 166, 168, 170 and 172 on the corresponding first~fourth cartridge heaters 146, 148, 150 and 152 to raise the temperatures of the first~fourth cartridge heaters to specific levels, e.g., the temperatures of all the cartridge heaters are raised to a single set temperature. During this process, the first~fourth heater control devices 166, 168, 170 and 172 implement control independently of one another, based upon the temperatures detected by the corresponding temperature sensors. Then, after the temperatures of the first~fourth cartridge heaters 146, 148, 150 and 152 all become stabilized at the set temperature, the actual resistances at the first~fourth cartridge heaters 146, 148, 150 and 152 at this temperature level are recorded.

Next, the temperature distribution constants $K_1$, $K_{s2}$, $K_3$ and $K_4$ are calculated based upon the individual actual resistances recorded above. First, 1 is set for the temperature distribution constant corresponding to one of the temperature sensors, e.g., for the temperature distribution constant $K_1$ at the detection position of the temperature sensor 250 manifesting the largest change in temperature. In addition, based upon the actual resistance at the first cartridge heater 146 corresponding to the temperature sensor 250 and the individual actual resistances at the second~fourth cartridge heaters 148, 150 and 152 corresponding to the temperature sensors other than the temperature sensor 250, a proportional operation is performed to calculate the resistances. As a result, coefficients calculated through the proportional operation are set as the temperature distribution constants $K_1$, $K_{s2}$, $K_3$ and $K_4$ corresponding to the first~fourth cartridge heaters 146, 148, 150 and 152 respectively.

Figure 4:
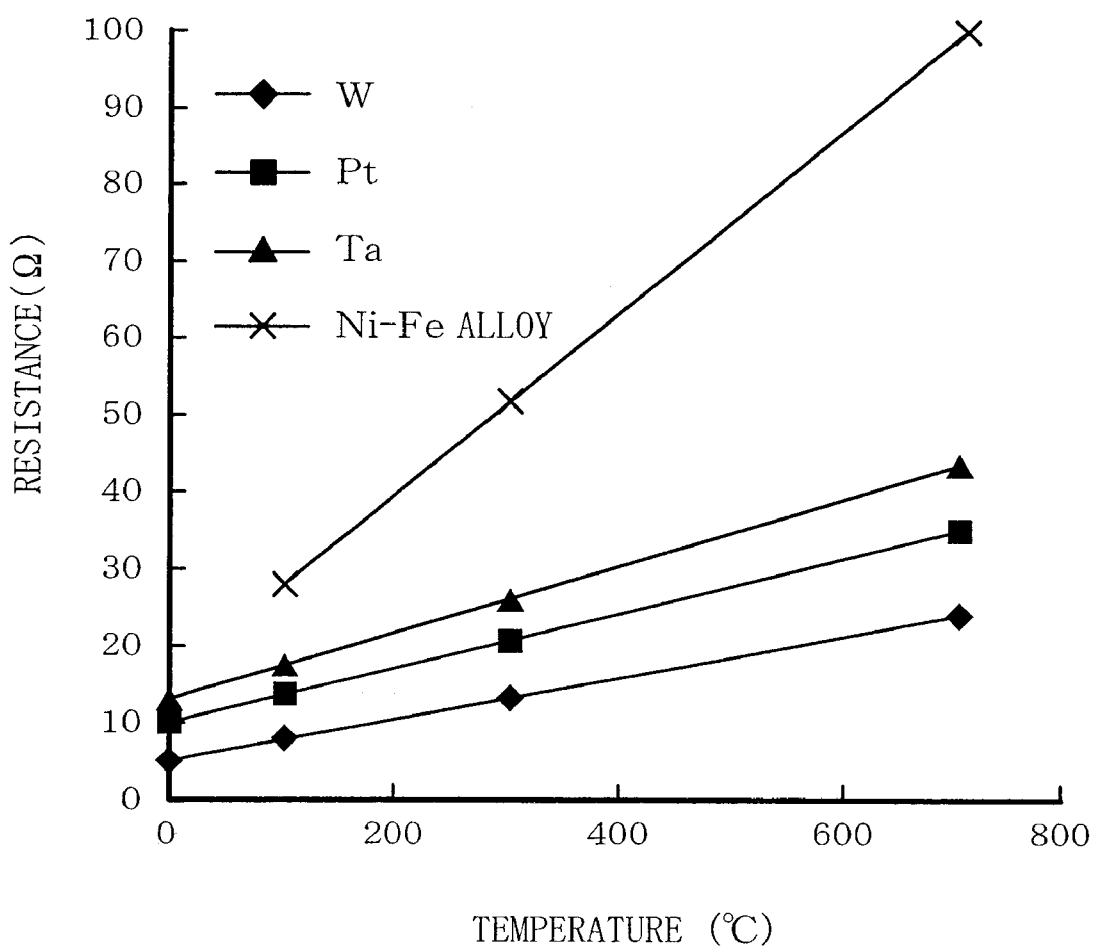
FIG. 4 schematically illustrates the characteristics achieved by the heating elements of various heaters provided at the CVD device shown in FIG. 1, and at a member connected to the CVD device.

A further explanation is given on the temperature control device 164. The temperature control device 164 outputs signals based upon the target resistances $R_{s1}$, $R_{s2}$, $R_{s3}$ and $R_{s4}$ to the corresponding first~fourth heater control devices 166, 168, 170 and 172 respectively. The target resistances $R_{s1}$, $R_{s2}$, $R_{s3}$ and $R_{s4}$ increase as the values of the temperature distribution constants $K_1$, $K_2$, $K_3$ and $K_4$ increase. In addition, the temperatures of the heating elements (156) of the first~fourth cartridge heaters 146, 148, 150 and 152 rise as the resistances increase, as shown in FIG. 4. Accordingly, the temperatures of the first~fourth cartridge heaters 146, 148, 150 and 152 become higher as the target resistances $R_{s1}$, $R_{s2}$, $R_{s3}$ and $R_{s4}$ increase. If, on the other hand, the values of the temperature distribution constants $K_1$, $K_2$, $K_3$ and $K_4$ are smaller, the target resistances $R_{s1}$, $R_{s2}$, $R_{s3}$ and $R_{s4}$ also become lower. Also, as shown in FIG. 4, the temperatures of the heating elements (156) of the first~fourth cartridge heaters 146, 148, 150 and 152 become lower as the resistances decrease. As a result, the temperatures of the first~fourth cartridge heaters 146, 148, 150 and 152 become lower as the target resistances $R_{s1}$, $R_{s2}$, $R_{s3}$ and $R_{s4}$ are reduced. In addition, the target resistances $R_{s1}$, $R_{s2}$, $R_{s3}$ and $R_{s4}$ change in response to changes in the values of the corrected reference resistances resulting from the correction explained earlier.

In the structure described above, the temperatures of the first~fourth cartridge heaters 146, 148, 150 and 152 installed at varying positions are set individually and independently of one another. Thus, even when the wall of the process chamber 102, i.e., the inner wall surface of the process chamber 102, is heated by using a plurality of heaters, i.e., the first~fourth cartridge heaters 146, 148, 150 and 152, uniformity in the temperature is assured over the entire inner wall surface of the process chamber 102.

The first~fourth heater control devices 166, 168, 170 and 172 control the power, e.g., the phase of AC power, supplied to the first~fourth cartridge heaters 146, 148, 150 and 152 based upon the corresponding target resistances $R_{s1}$, $R_{s2}$, $R_{s3}$ and $R_{s4}$ and heater resistances $R_{s1}$, $R_{s2}$, $R_{s3}$ and $R_{s4}$ which are to be explained later. In addition, the first~fourth heater control devices 166, 168, 170 and 172 keep the temperature of the inner wall of the process chamber 102 at a specific level by controlling the quantities of heat generated by the first~fourth cartridge heaters 146, 148, 150 and 152 .

(b) Structures of Heater Control Devices

Figure 6:
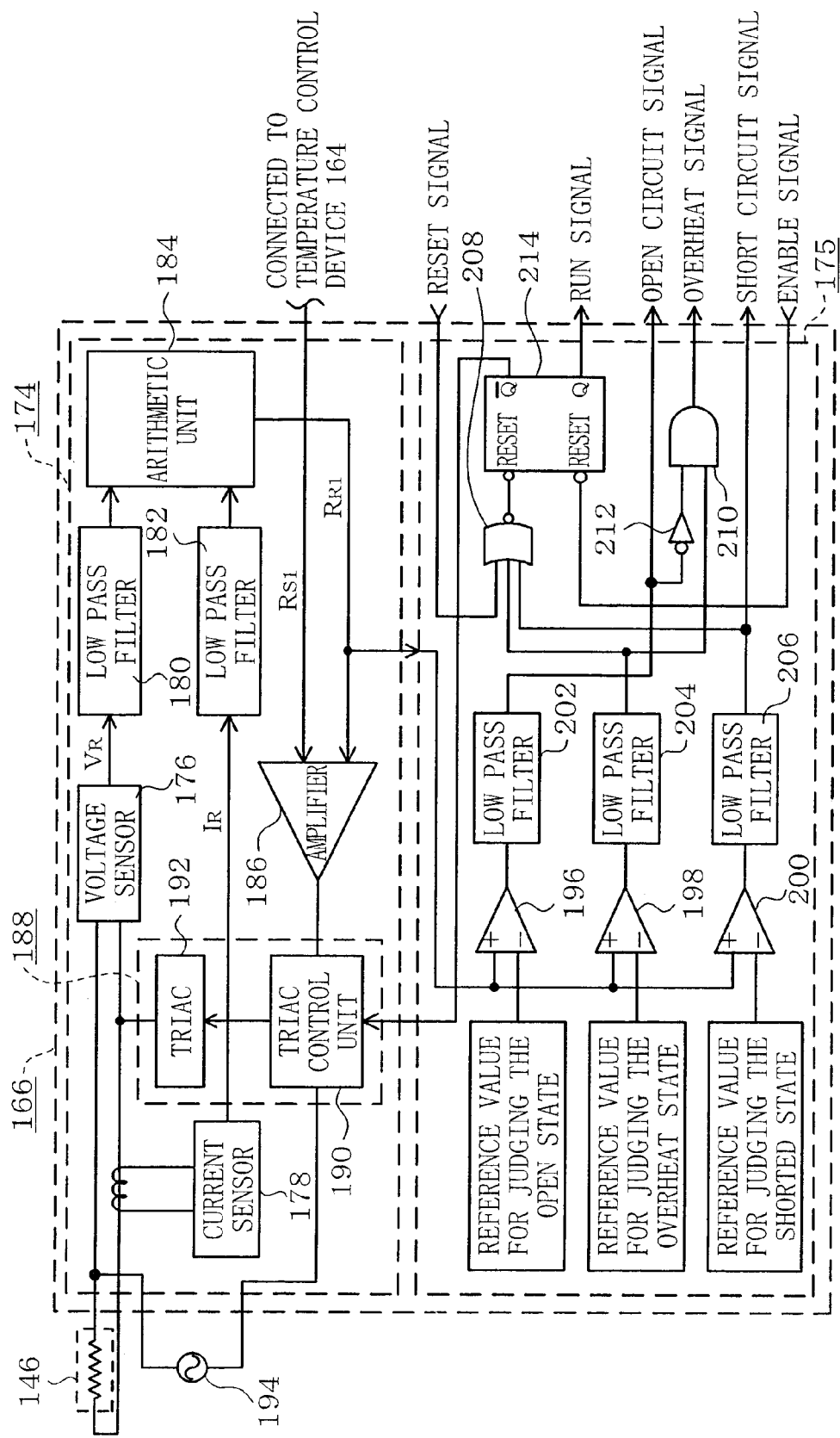
FIG. 6 is a schematic diagram illustrating the structure of a heater control device shown in FIG. 5.

Next, the structures assumed by the first~fourth heater control devices 166, 168, 170 and 172 are explained by focusing on the first heater control device 166 shown in FIG. 6 as an example. First, the heater control device 166, which is constituted of a heater control unit 174 and an interlock control unit 175, controls the phase of the AC power supply to the first cartridge heater 146. The heater control unit 174 is constituted of a voltage sensor 176, a current sensor 178, low pass filters 180 and 182, an arithmetic unit 184, and amplifier 186 and a phase control unit 188. The phase control unit 188 is constituted of a triac control unit 190 and a triac (AC switch) 192 connected to the triac control unit 190.

The voltage sensor 176 measures a feedback voltage value $V_R$ which is determined based upon the voltage applied to the first cartridge heater 146. A signal corresponding to the feedback voltage value $V_R$ is output to the arithmetic unit 184 via the low pass filter 180. The current sensor 178, on the other hand, measures a feedback current value $I_R$ which is determined based upon the current flowing through the first cartridge heater 146. A signal corresponding to the feedback current value $I_R$ is output to the arithmetic unit 184 via the low pass filter 182. The arithmetic unit 184 calculates a heater resistance $R_{R1}$ representing the actual resistance at the first cartridge heater 146 based upon the feedback voltage value $V_R$ and the feedback current value $I_R$ as is to be detailed later. In addition, the arithmetic unit 184 outputs a signal corresponding to the heater resistance $R_{R1}$ to the triac control unit 190 via the amplifier 186. The arithmetic unit 184 also outputs a signal corresponding to the heater resistance $R_{R1}$ to comparators 196, 198 and 200 to be detailed later, which constitutes the interlock control unit 175. It is to be noted that the structure of the arithmetic unit 184 is to be explained later. A signal corresponding to the target resistance $R_{s1}$ output from the temperature control device 164 is input to the amplifier 186. Thus, the signal corresponding to the target resistance $R_{s1}$ is provided to the triac control unit 190 via the amplifier 186.

One end of an AC source 194 is connected to the triac control unit 190. In addition, an RS latch 214 constituting the interlock control unit 175 is connected to the triac control unit 190. The other end of the AC source 194 and the output end of the triac 192 are connected to the individual input ends of the first cartridge heater 146.

In this structure, the triac control unit 190 controls the phase of the AC power that is output from the triac 192 to the first cartridge heater 146 so as to equalize the heater resistance $R_{R1}$ to the target resistance $R_{s1}$ with the heater resistance $R_{R1}$ conforming to the target resistance $R_{s1}$. In other words, the triac control unit 190 implements the control described above so that the temperature of the first cartridge heater 146 is set essentially equal to the temperature determined by the temperature control device 164 (hereafter referred to as a "target temperature").

Figure 7A:
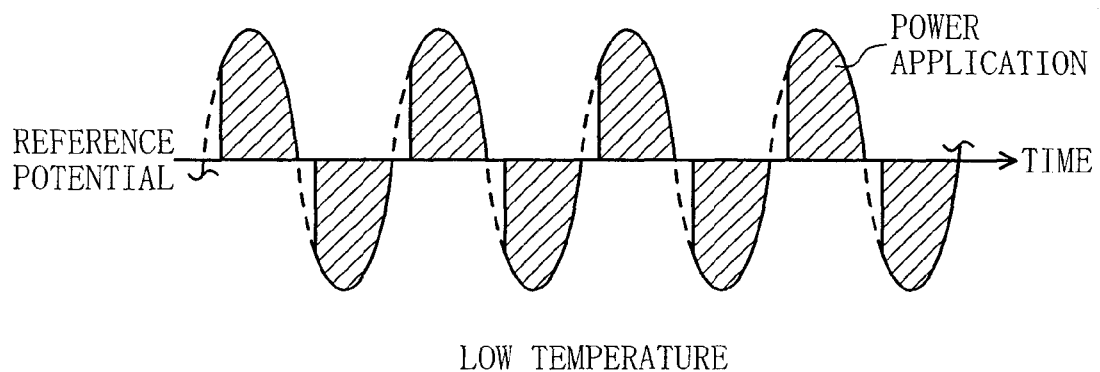
FIG. 7 schematically illustrates the phase control implemented by the phase control unit shown in FIG. 6.
Figure 7B:
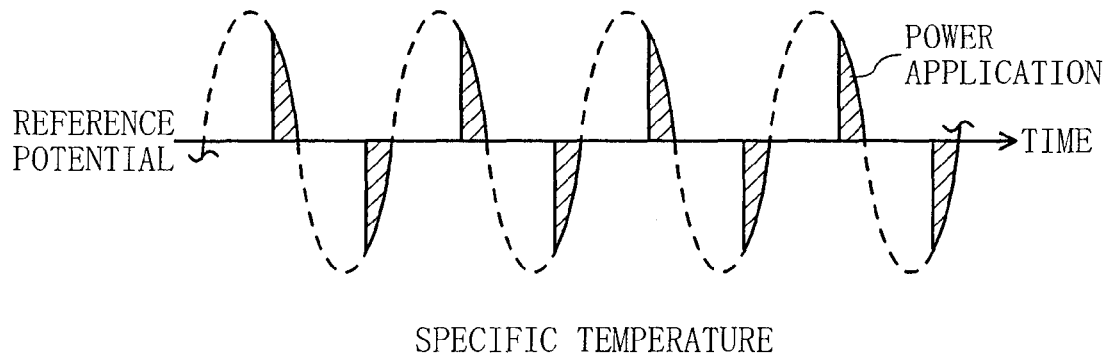
Figure 7C:
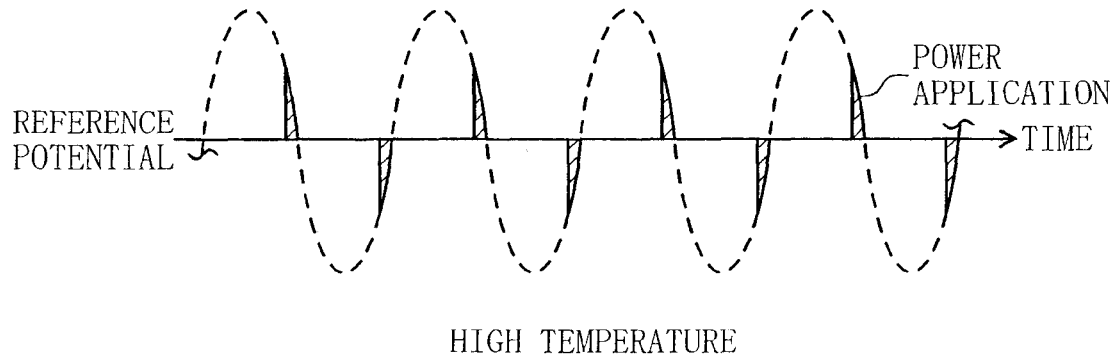

To explain in further detail, the triac control unit 190 implements control on the triac 192 to increase the length of time over which the AC power is applied at ½ cycles and thus increase the quantity of heat that is generated if the heater resistance $R_{R1}$ is lower than the target resistance $R_{s1}$, and the temperature of the first cartridge heater 146 is lower than the target temperature, as shown in FIG. 7(a). In addition, if the heater resistance $R_{R1}$ and the target resistance $R_{s1}$ are roughly equal to each other and the temperature of the first cartridge heater 146 is essentially equal to the target temperature, it implements control on the triac 192 to sustain the current length of time over which the AC power is applied at ½ cycles to sustain the quantity of heat that is generated at a constant level, as shown in FIG. 7(b). If the heater resistance $R_{R1}$ is higher than the target resistance $R_{s1}$ and that temperature of the first cartridge heater 146 is higher than the target temperature, it implements control on the triac 192 so as to reduce the length of time over which the AC power is applied at ½ cycles to reduce the quantity of heat generated, as shown in FIG. 7(c).

As described above, the temperature of the first cartridge heater 146 is adjusted by implementing ½ cycle phase control on the AC power applied to the first cartridge heater 146. As a result, a temperature deviation occurs less readily than in a structure in which the temperature is adjusted through on/off control on the power. Thus, the temperature of the first cartridge heater 146 can be sustained evenly.

The interlock control unit 175 is constituted of the comparators 196, 198 and 200, low pass filters 202, 204 and 206, a NOR gate 208, an AND gate 210, an invertor circuit 212 and the RS latch 214.

The comparator 196 outputs an open circuit signal via the low pass filter 202 if the heater resistance $R_{R1}$ is higher than a reference value used to judge the open (disconnect) state of the circuit constituting the heater control unit 174. Part of the open circuit signal is provided to the RS latch 214 via the invertor circuit 212, the AND gate 210 and the NOR gate 208 and another part of the open circuit signal is provided to a circuit other than the first heater control device 166.

The comparator 198 outputs an overheat signal via the low pass filter 204 if the heater resistance $R_{r1}$ is higher than a reference value used to judge whether or not the first cartridge heater 146 is in an overheated state. The reference value represents, for instance, the resistance of the heating wire 156 when the temperature at the inner wall surface of the process chamber 102 has reached 190° C. or the surface of the heat insulating material 103 has reached 50° C. In addition, part of the overheat signal is provided to the RS latch 214 via the NOR gate 208 and another part of the overheat signal is provided to a circuit other than the first heater control device 166 via the AND gate 210.

The comparator 200 outputs a short circuit signal via the low pass filter 206 if the heater resistance $R_{R1}$ is lower than a reference value used to judge whether not the circuit constituting the heater control unit 174 is in a shorted state. Part of the short circuit signal is provided to the RS latch 214 via the NOR gate 208 and another part of the short circuit signal is provided to a circuit other than the first heater control device 166.

In addition, the RS latch 214 is provided with an enable signal and a reset signal which is input via the NOR gate 208, as well as the signals explained above. When a specific signal is input, the RS latch 214 outputs an interlock signal to the triac control unit 190. The specific signal is constituted of at least one of; the open circuit signal, the overheat signal and the short circuit signal. When the interlock signal is input, the triac control unit 190 suspends the supply of the AC power from the triac 192 to the first cartridge heater 146. In addition, the output of the interlock signal is stopped by inputting the reset signal to the RS latch 214. By inputting the enable signal to the RS latch 214, the interlock signal is output to the triac control unit 190 regardless of whether or not the open circuit signal, the overheat signal or the short circuit signal is input.

By adopting the structure described above, it is possible to detect any error such as the first cartridge heater 146 becoming overheated to a temperature equal to or higher than a specific upper limit or a failure occurring at the heater control unit 174, based upon the heater resistance $R_{r1}$. This eliminates the need for providing an interlock sensor such as a thermostat or the like at the CVD device 100. It is not necessary to provide a wiring or the like to connect the sensor to the heater controller 160, either. As a result, a further reduction in the cost, a further improvement in the maintainability and further miniaturization of the apparatus are achieved. Moreover, errors such as the first cartridge heater 146 becoming heated to an abnormally high temperature can be detected directly. Thus, corrective measures can be taken quickly in response to an error to minimize damage to the device.

(c) Structure of Arithmetic Unit

Figure 8:
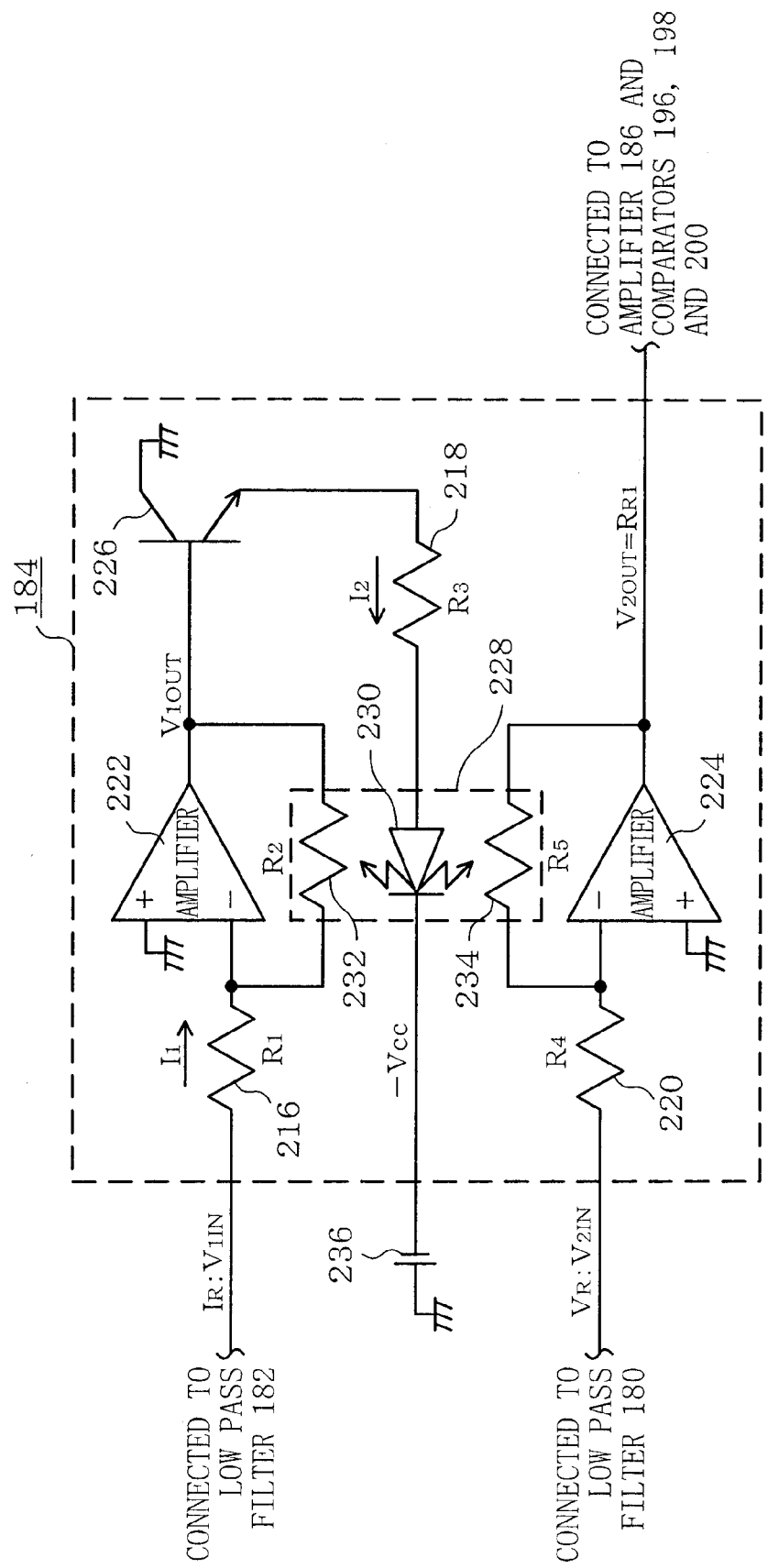
FIG. 8 is a schematic block diagram of the arithmetic unit shown in FIG. 6.

Next, in reference to FIG. 8, the structure assumed by the arithmetic unit 184 is explained. The arithmetic unit 184 is constituted of resistive elements 216, 218 and 220, amplifiers 222 and 224, a transistor 226 and a photo coupler 228. The photo coupler 228 is constituted of an LED (light emitting diode) 230 and light-receiving elements (resistive elements) 232 and 234 which may be constituted of, for instance, CdS (cadmium sulfide).

The resistive element 216 achieving a resistance $R_1$ and the light-receiving element 232 achieving a resistance $R_2$ are connected to one end (−) at the input end of the amplifier 222. The low pass filter 182 shown in FIG. 6 is connected to the resistive element 216. The other end (+) at the input end of the amplifier 222 is grounded. At the output end of the amplifier 222, the base of the transistor 226 and the light-receiving element 232 are connected. The emitter of the transistor 226 is connected to the anode (a P-type semiconductor) of the LED 230 via the resistive element 218 achieving a resistance $R_3$. The collector of the transistor 226 is grounded. In addition, a grounded DC source 236 is connected to the cathode (an N-type semiconductor) of the LED 230.

When a voltage $V_{1IN}$ of a feedback current value $I_R$ signal is input to the resistive element 216 through the low pass filter 182, a current $I_1$ flows to the resistive element 216. The voltage $V_{1IN}$ is amplified at the amplifier 222 which then outputs a voltage $V_{1OUT}$. The voltage $V_{1OUT}$ is then input to the resistive element 218 via the transistor 226, causing a current I2 to flow to the resistive element 218.

The resistive element 220 and the light-receiving element 234 are connected to one end (−) at the input end of the amplifier 224. The low pass filter 180 shown in FIG. 6 is connected to the resistive element 220. The other end (+) at the input end of the amplifier 224 is grounded. At the output end of the amplifier 224, the light-receiving element 234 and the amplifier 186 and the comparators 196, 198 and 200 shown in FIG. 6 are connected.

Next, the process implemented by the arithmetic unit 184 to calculate a heater resistance $R_R$ based upon the feedback voltage value $V_R$ and the feedback current value $I_R$ is explained in reference to the mathematical expressions presented below.

First, the resistance $R_2$ at the light-receiving element 232 is solved by using the voltage $V_{1OUT}$ output by the amplifier 222 to obtain the current $I_2$ flowing through the resistive element 218 expressed as;

$$I_2 = (V_{1OUT} - (-V_{cc}) - V_{be} - V_{LED})/R_3 \quad (1),$$

with $-V_{cc}$ representing the voltage at the DC source 236, $V_{be}$ representing the voltage between the base and the emitter of the transistor 226 and VLED representing the voltage at the LED 230. By substituting "$V_{cc} - V_{be} - V_{LED}$" in expression (1) with $V_{CONST}$, expression (1) is rendered to;

$$I_2 = (V_{1OUT} + V_{CONST})/R_3 \quad (2)$$

In addition, since the resistance R2 is in reverse proportion to the current $I_2$;

$$1/R_2 = K_1 \cdot I_2 \quad (3)$$

is true, with $K_1$ representing the current amplification factor at the LED 230.

By incorporating expression (2) above in expression (3), $1/R_2$ is re-expressed as;

$$1/R_2 = K_1(V_{1OUT} + V_{CONST})/R_3 \quad (4)$$

Expression (4) is modified to;

$$V_{1OUT} = (R_3/(R_2 K_1)) - V_{CONST} \quad (5)$$

The voltage $V_{1IN}$ corresponding to the feedback current value $I_R$ is expressed as;

$$V_{1IN} = R_1 I_1$$
$$= R_1(V_{1OUT}/R_2)$$
$$= (R_1/R_2)((R_3/(R_2 K_1)) - V_{CONST}$$
$$= ((R_1 R_3)/(R_2^2 K_1)) - (R_1/R_2)V_{CONST} \quad (6)$$

By conforming to conditions $R_2^2 K_1 \gg R_1 \cdot R_3$, expression (6) above is modified to;

$$V_{1IN} = -(R_1/R_2)V_{CONST} \quad (7)$$

The voltage $V_{2OUT}$ corresponding to the heater resistance $R_{R1}$ is expressed as;

$$V_{2OUT} = -(R_5/R_4)V_{2IN} \quad (8)$$

The light-receiving elements 232 and 234 mentioned earlier achieve electrical characteristics that are essentially identical to each other. Thus, the resistance $R_2$ at the light receiving element 232 and the resistance $R_5$ at the light receiving element 234 can be regarded to be essentially equal to each other. Consequently, by incorporating expression (7) in expression (8), $V_{2OUT}$ is expressed as;

$$V_{2OUT} = -(1/R_4)(-(R_1/V_{1IN})V_{CONST})V_{2IN}$$
$$= (V_{2IN}/V_{1IN})(R_1/R_4)V_{CONST} \quad (9)$$

Three conditions expressed as;

$$(R_1/R_4) \cdot V_{CONST} = \text{constant (CONST)}$$
$$V_{2IN} = k_1 \cdot V_R \text{ and}$$
$$V_{1IN} = k_2 \cdot I_R$$

are imposed on expression (9). As a result, the voltage $V_{2OUT}$ is expressed as;

$$V_{2OUT} = k \cdot (V_R/I_R) = k R_{R1}$$

$k_1$ and $k_2$ each represent a specific constant. In addition, $k = k_1/k_2$ and $R_{R1} = V_R/I_R$ are true with respect to k and $R_R$. Thus, the voltage $V_{2OUT}$ output from the arithmetic unit 184 changes in proportion to the heater resistance $R_{R1}$.

Through the arithmetic operation described above, the heater resistance $R_{R1}$ can be ascertained with ease by simply inputting the feedback voltage value $V_R$ and the feedback current value $I_R$ to the arithmetic unit 184. In addition, the photo coupler 228 is employed as a constituent of the arithmetic unit 184. As a result, the heater resistance can be obtained in a stable manner even when the feedback current value is small, thereby making it possible to produce the arithmetic unit 184 at a relatively low cost. In addition, the heater resistance $R_{R1}$ can be ascertained quickly through an arithmetic operation by adopting this structure. Consequently, the first cartridge heater 146, can be controlled with good response.

The first cartridge heater 146 is controlled as described above. The second~fourth cartridge heaters 148, 150 and 152, too, are controlled in a manner similar to that with which the first cartridge heater 146 is controlled, to keep their temperatures at specific levels. In addition, by correcting the reference resistances at the other heaters, i.e., the resistance heater 112 and the mantle heaters 140, 144 and 260, based upon the temperatures detected by the temperature sensors, as in the third embodiment to be detailed later, control similar to that implemented on the first~fourth cartridge heaters 146, 148, 150 and 152 is achieved for the resistance heater 112 and the mantle heaters 140, 144 and 260.

Second Embodiment

Figure 9:
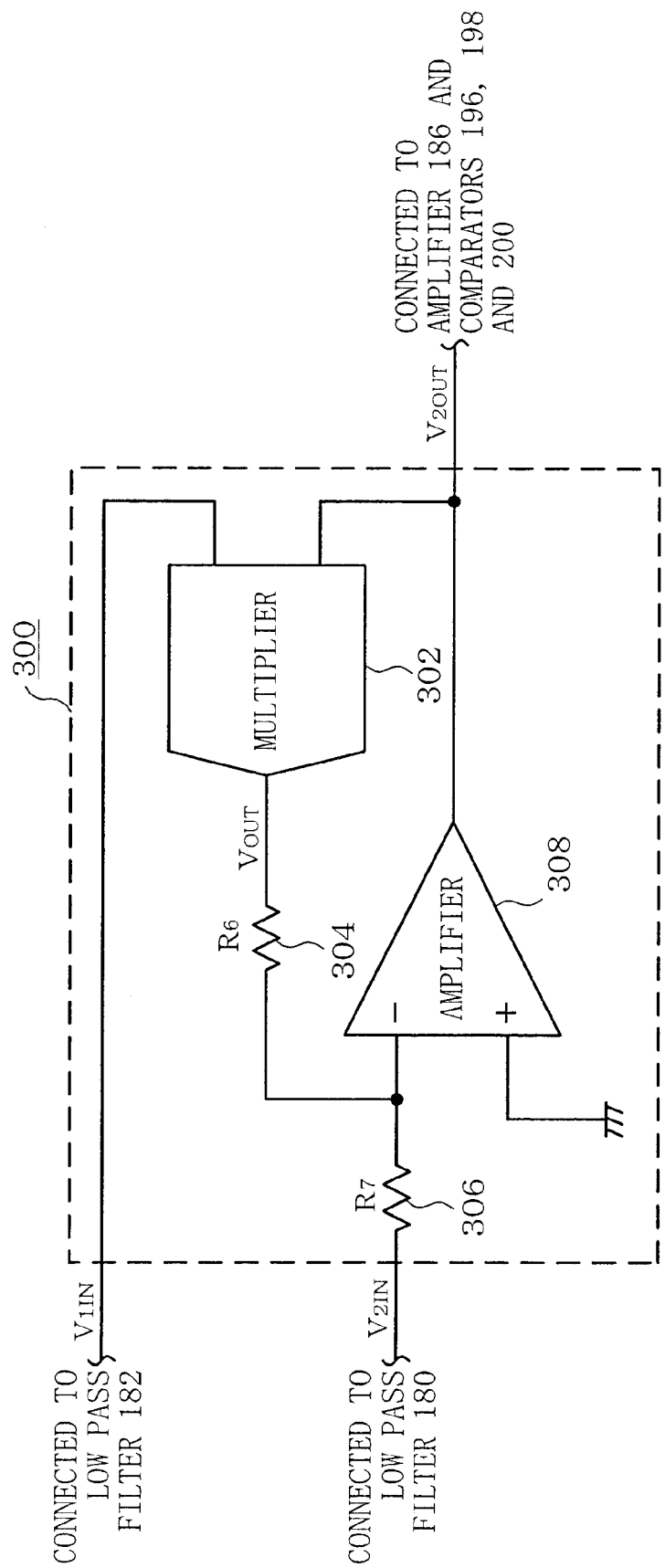
FIG. 9 schematically illustrates a structure that may be adopted in the arithmetic unit in another embodiment of the present invention.

Next, the second embodiment of the present invention is explained. The embodiment is characterized in that the heater resistance is calculated by employing an arithmetic unit 300 adopting a simpler structure than the arithmetic unit 184 provided with the photo coupler 228. Namely, the arithmetic unit 300 comprises a multiplier 302 constituted of an analog integrated circuit, resistive elements 304 and 306 and an amplifier 308, as shown in FIG. 9. The low pass filter 182 shown in FIG. 6 is connected to one end at the input end of the multiplier 302. The output end of the amplifier 308 is connected to the other end at the input end of the multiplier 302. At one end (−) at the input end of the amplifier 308, the output end of the multiplier 302 and the low pass filter 180 shown in FIG. 6 are connected respectively via the resistive element 304 and the resistive element 306. The other end (+) at the input end of the amplifier 308 is grounded. The output end of the amplifier 308 is connected to the input end of the multiplier 302 and also to the amplifier 186 and the comparators 196, 198 and 200 shown in FIG. 6. The low pass filters 180 and 182 respectively output the voltage $V_{2IN}$ and a voltage $V_{1IN}$ as explained earlier. The multiplier 302 outputs a voltage $V_{OUT}$. The amplifier 308 outputs the $V_{2OUT}$ mentioned earlier. The resistive element 304 and the resistive element 306 respectively achieve a resistance $R_6$ and a resistance $R_7$.

Next, the arithmetic operation performed by the arithmetic unit 300 to calculate the heater resistance $R_{R1}$ is explained in reference to the mathematical expressions presented below. The voltage $V_{OUT}$ output by the multiplier 302 is expressed as;

$$V_{OUT} = V_{1IN} V_{2OUT} \tag{10}$$

The input end (−) of the amplifier 308 is an imaginary short. Thus, $$(V_{OUT}/R_6) + (V_{2IN}/R_7) = 0 \tag{11}$$

is true. Expression (11) is incorporated in expression (10) to calculate the voltage $V_{2OUT}$, which is then expressed as;

$$V_{2OUT} = -(R_6/R_7)(V_{2IN}/V_{1IN}) \tag{12}$$

Assuming that $R_6 = R_7$, the voltage $V_{2OUT}$ is expressed as;

$$V_{2OUT} = -(V_{2IN}/V_{1IN})$$

As described above, the arithmetic unit 300 functions as a divider and the voltage $V_{2OUT}$ can be ascertained based upon the voltages $V_{1IN}$ and $V_{2IN}$. As a result, the heater resistance $R_{R1}$ which changes in proportion to the voltage $V_{2OUT}$ can be determined. Since other structural features are essentially identical to those assumed in the CVD device 100 explained earlier, their explanation is omitted.

By employing the arithmetic unit 300 structured as described above, the number of elements and the like constituting the arithmetic unit 300 can be reduced. Consequently, the offset adjustment is simplified. In addition, the in uniformity in the characteristics of the individual elements can be reduced to achieve an improvement in arithmetic operation accuracy. Furthermore, the circuit of the arithmetic unit 300 can be achieved through a relatively simple structure. As a result, the arithmetic unit 300 can be miniaturized so that it can be installed in a small space.

Third Embodiment

Next, the third embodiment of the present invention is explained. The embodiment is characterized in that the temperatures of the mantle heaters 140, 144 and 260 are controlled based upon the actual resistances at the mantle heaters 140, 144 and 260 and the temperatures detected by the temperature sensors. It is to be noted that since the temperatures of the mantle heaters 140, 144 and 260 are each controlled in a manner essentially identical to the manner with which the temperatures of the other mantle heaters are controlled, an explanation is given on the temperature control implemented on the mantle heater 260 as a typical example.

Figure 10:
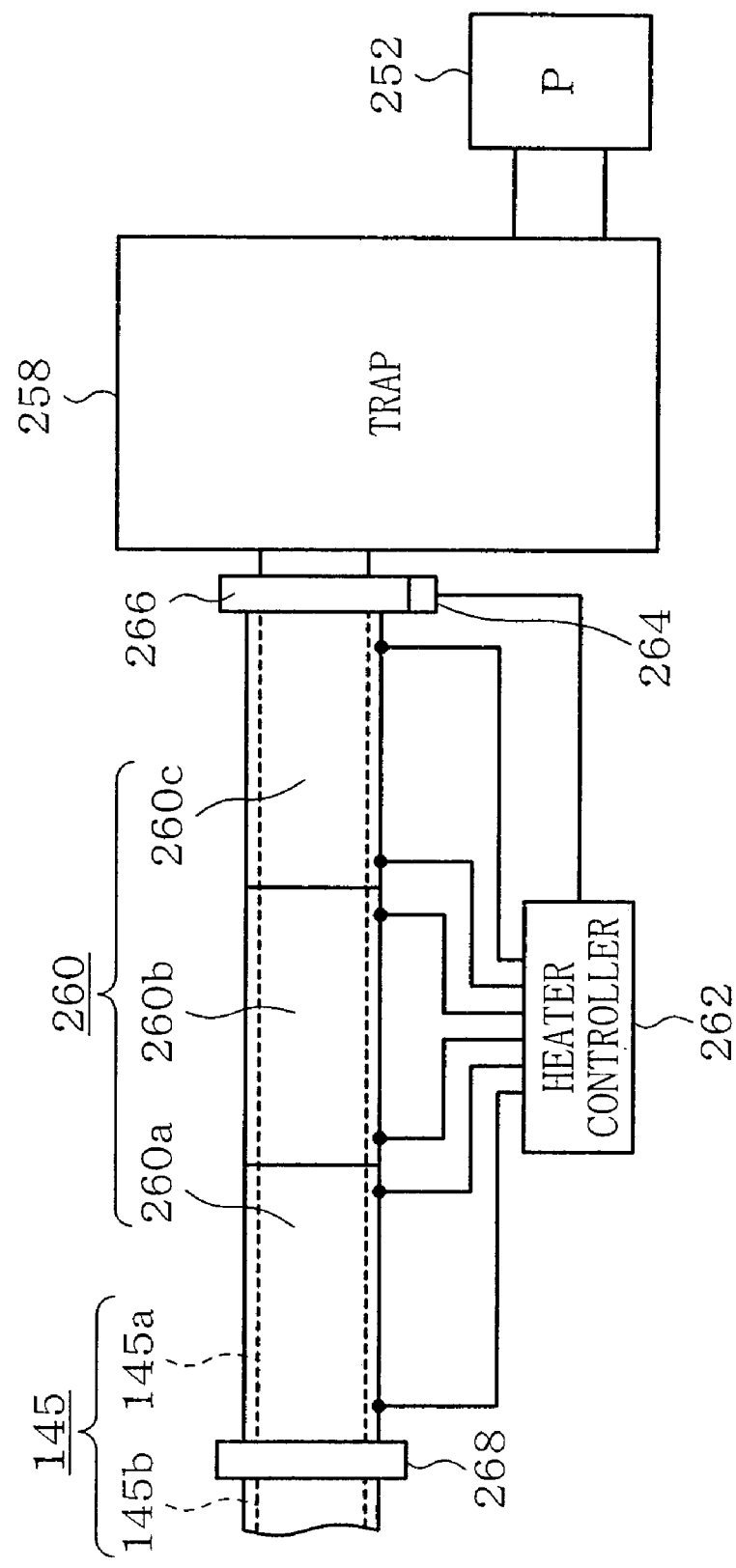
FIG. 10 schematically illustrates a control structure that may be adopted in the mantle heater control in another embodiment of the present invention.

As already explained, the mantle heater 260 shown in FIGS. 1 and 10 is provided so as to enclose the evacuating pipe 145. In addition, as illustrated in FIG. 10, the evacuating pipe 145 is divided into a plurality of portions, e.g., a first evacuating pipe 145a and a second evacuating pipe 145b. The trap 258 and the second evacuating pipe 145b are connected to the first evacuating pipe 145a via a first connecting member 266 and a second connecting member 268 respectively. In addition, the second evacuating pipe 145b is connected to the process chamber 102 shown in FIG. 1.

Also, as illustrated in FIG. 10, the mantle heater 260 enclosing the first evacuating pipe 145a is divided into a plurality of portions, e.g., first~third mantle heaters 260a, 260b and 260c. The first mantle heater 260a is provided toward the second evacuating pipe 145b which is heated by another mantle heater. The third mantle heater 260c is provided toward the trap 258. In addition, the second mantle heater 260b is provided between the first mantle heater 260a and the third mantle heater 260c. The trap 258 is cooled. Thus, the portion of the first evacuating pipe 145a corresponding to the position at which the second mantle heater 260b is provided is cooled least readily, the portion of the first evacuating pipe 145a at the position at which the first mantle heater 260a is provided is cooled relatively readily and the portion of the first evacuating pipe 145a at the position at which the third mantle heater 260c is provided is cooled most readily. For this reason, the temperature sensor 264 is mounted in the vicinity of the installation position at which the third mantle heater 260c is mounted where the temperature of the evacuating pipe 145 can be detected with a high degree of sensitivity, e.g., at the first connecting member 266.

The first~third mantle heaters 260a, 260b and 260c and the temperature sensor 264 are connected to the heater controller 262. The temperature control device (not shown) of the heater controller 262 calculates a target resistance by correcting the reference resistance ascertained in correspondence to the set temperature with a correction value obtained based upon the temperature detected by the temperature sensor 264. Then, first~third heater control devices (not shown) of the heater controller 262 implement temperature control on the first~third mantle heaters 260a, 260b and 260c based upon the actual resistances of the first third mantle heaters 260a, 260b and 260c and the target resistance. Other structural features are identical to those adopted in the heater controller 160 explained earlier. In this structure, the reference resistance is corrected based upon the temperature detected by the temperature sensor 264. As a result, even more accurate temperature control on the mantle heater 260 is achieved. It is to be noted that this embodiment may be adopted in the resistance heater 112 as well.

Fourth Embodiment

Next, the fourth embodiment of the present invention is explained. This embodiment is characterized in that the temperatures of a plurality of heaters are controlled based upon the voltages applied to the individual heaters. The following is an explanation of the temperature control implemented on the first~fourth cartridge heaters 146, 148, 150 and 152.

Figure 11:
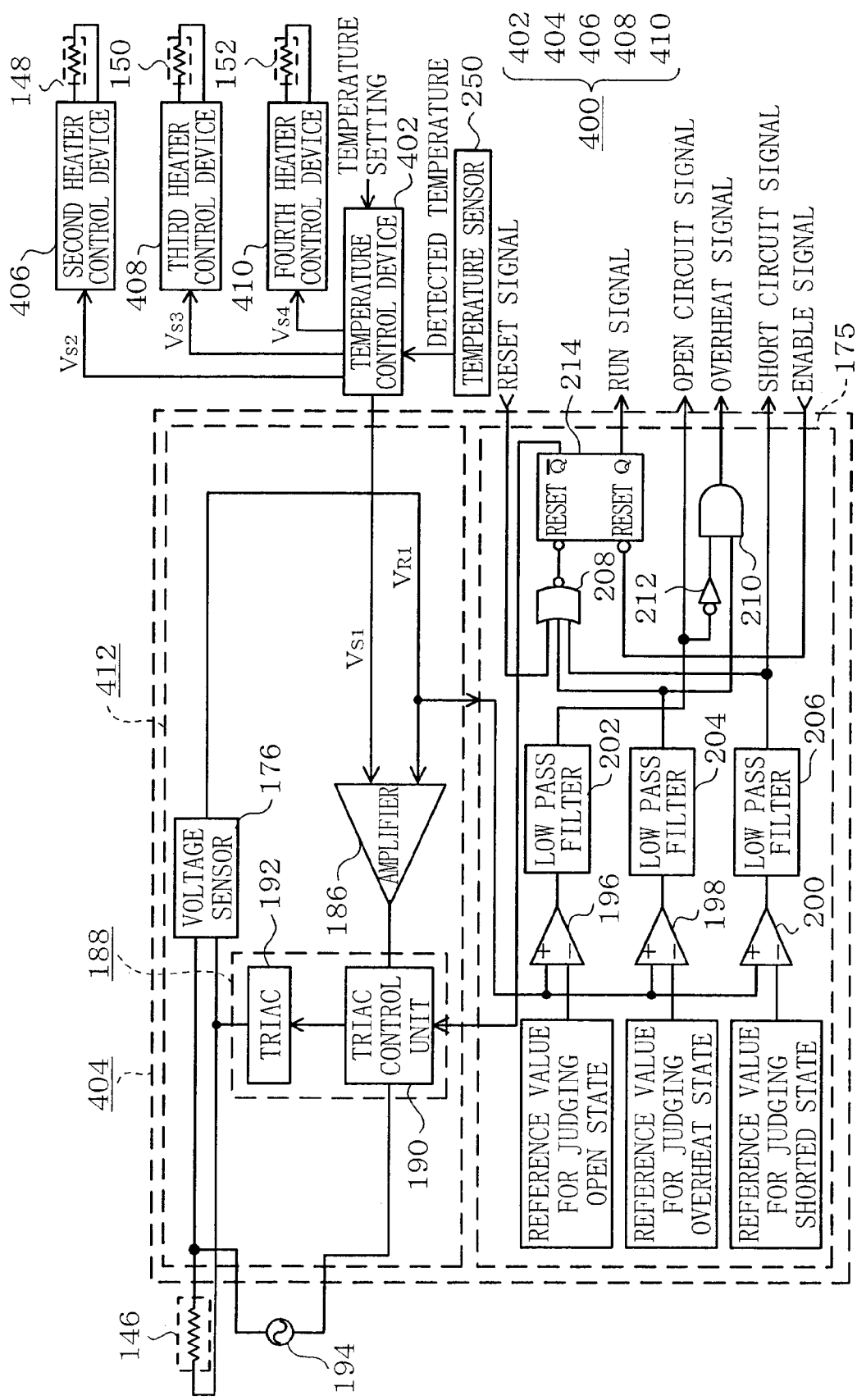
FIG. 11 schematically illustrates a heater controller achieved in another embodiment of the present invention.

As shown in FIG. 11, a heater controller 400 is constituted of a temperature control device 402 and first~fourth heater control devices 404, 406, 408 and 410. The temperature control device 402 calculates a reference voltage value in correspondence to the set temperature. In addition, the temperature control device 402 calculates a corrected reference voltage value by correcting the reference voltage value with a correction value obtained in correspondence to the set temperature and the temperature detected by the temperature sensor 250. Then, the temperature control device 402 calculates target voltage values $V_{s1}$, $V_{s2}$, $V_{s3}$ and $V_{s4}$ by multiplying the corrected reference voltage value by temperature distribution constants $K_1$, $K_2$, $K_3$ and $K_4$. Other structural features are identical to those adopted in the temperature control device 164 explained earlier.

The first~fourth heater control devices 404, 406, 408 and 410 are structured identically to one another. In addition, the first~fourth heater control devices 404, 406, 408 and 410 control the voltages applied to the first~fourth cartridge heaters 146, 148, 150 and 152 based upon the corresponding target voltage values $V_{s1}$, $V_{s2}$, $V_{R3}$ and $V_{R4}$ and feedback voltage values (actual voltage values) $V_{R1}$, $V_{R2}$ $V_{R3}$ and $V_{R4}$ of the first~fourth cartridge heaters 146, 148, 150 and 152, which are to be detailed later.

Now, an explanation is given on the first~fourth heater control devices 404, 406, 408 and 410 by focusing on the first heater control device 404 as a typical example. The first heater control device 404 is constituted of a heater control unit 412 and an interlock control unit 175. The 412 is structured identically to the 174 shown in FIG. 6 except for that it is not provided with the current sensor 178, the low pass filter 182 and the arithmetic unit 184. The first heater control device 404 assuming such a structure controls the phase of the AC power supplied to the first cartridge heater 146 based upon the target voltage value $V_{s1}$ and the feedback voltage value $V_{R1}$ of the first cartridge heater 146.

Figure 12:
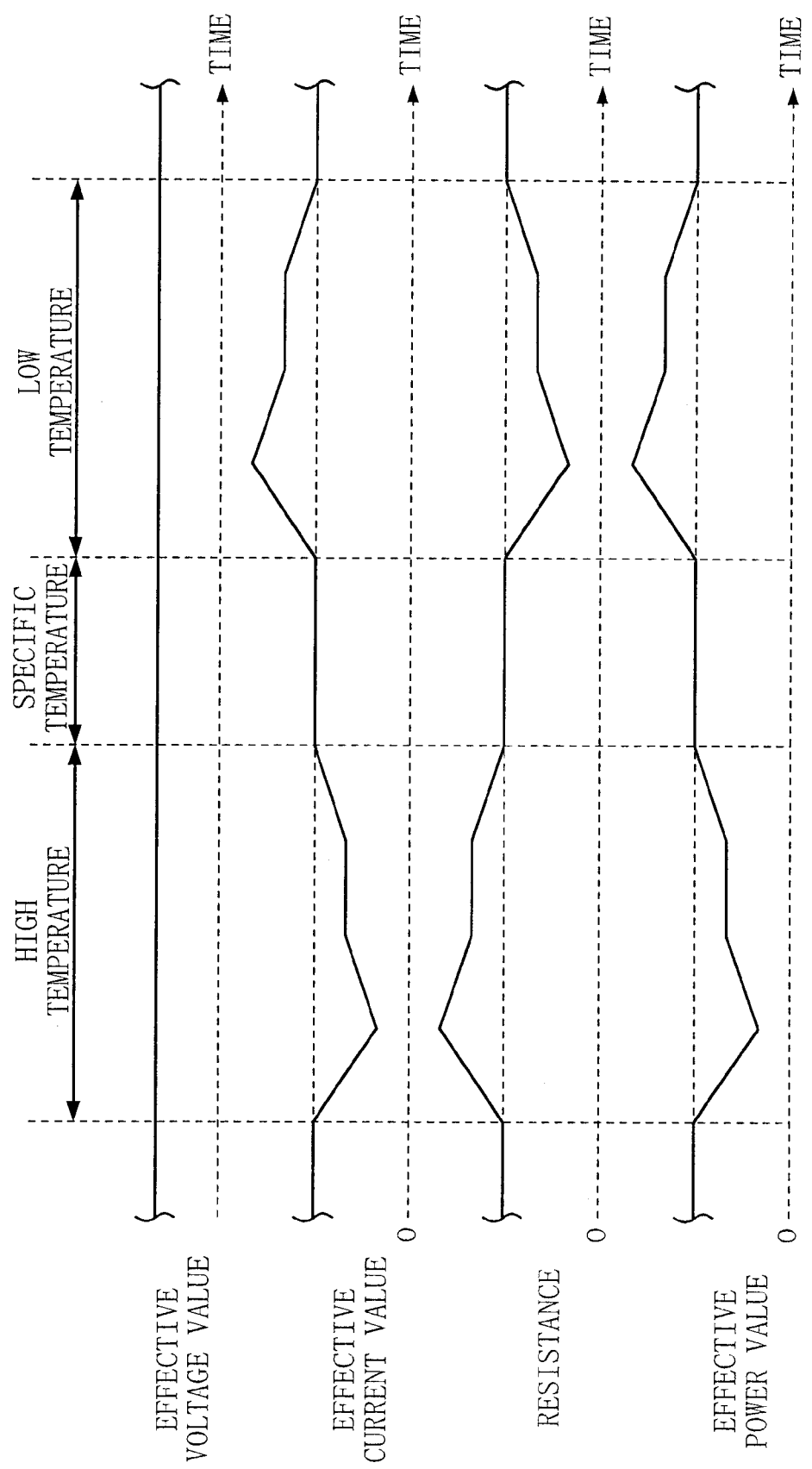
FIG. 12 schematically illustrates the control structure adopted in the heater controller shown in the FIG. 11.

In other words, the feedback voltage value $V_{R1}$ is input from the voltage sensor 176 to the triac control unit 190 via the amplifier 186. The feedback voltage value $V_{R1}$ is a value determined based upon the value of the voltage applied to the first cartridge heater 146. In addition, the target voltage value $V_{s1}$ obtained at the temperature control device 402 is input to the triac control unit 190 via the amplifier 186. As illustrated in FIG. 7 referred to earlier, the triac control unit 190 controls the phase of the AC power output from the triac 192 to the first cartridge heater 146 so as to equalize the feedback voltage value $V_{R1}$ to the target voltage value $V_{s1}$. It is to be noted that FIG. 12 illustrates the relationships among the change in the temperature of the first cartridge heater 146, the effective voltage value of the voltage applied to the first cartridge heater 146, the effective current value of the current flowing through the first cartridge heater 146, the resistance at the first cartridge heater 146 and the effective current value of the power supplied to the first cartridge heater 146, achieved during the control operation in the embodiment. In addition, since the phase control implemented on the AC power is identical to that in the first embodiment, its explanation is omitted.

In this structure, the feedback voltage value $V_{R1}$ can be obtained without having to perform an arithmetic operation and the power can be directly controlled in conformance to the feedback voltage value $V_{R1}$. As a result, the temperature control on the first cartridge heater 146 is facilitated. In addition, since it is not necessary to provide an arithmetic unit, the structure of the heater control unit 412 is simplified. It is to be noted that the embodiment may be also adopted in the resistance heater 112 and in the mantle heaters 140, 144 and 260 as well. Furthermore, while an example of the structure that phase control is implemented on the power supplied to the first cartridge heater 146 is explained in reference to the embodiment, the present invention is not limited to this example, and the power may be controlled through, zero cross control or linear control to be explained later.

Fifth Embodiment

Next, the fifth embodiment of the present invention is explained. This embodiment is characterized in that zero cross control is implemented on the power applied to the various heaters. Now, an explanation is given in reference to the first heater control device 166 as a typical example. The first heater control device 166 in which the embodiment is adopted is provided with a zero cross control unit (not shown) instead of the phase control unit 188. The zero cross control unit implements zero cross control on the AC power applied to the first cartridge heater 146 so as to ensure that the heater resistance $R_{R1}$ that has been input conforms to the target resistance $R_{s1}$.

Figure 13A:
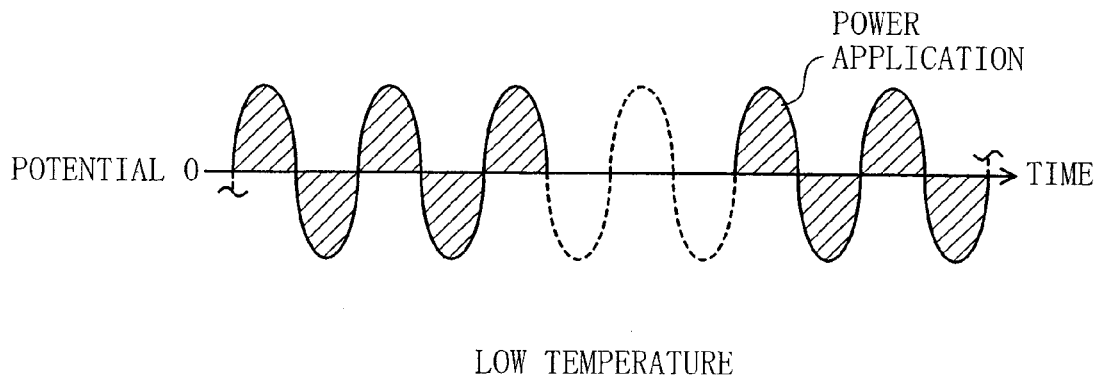
FIG. 13 schematically illustrates zero cross control implemented in another embodiment of the present invention.
Figure 13B:
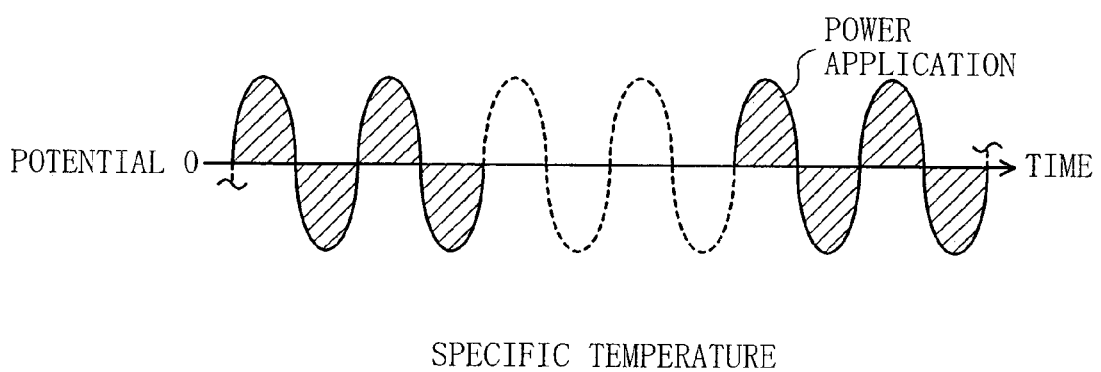
Figure 13C:
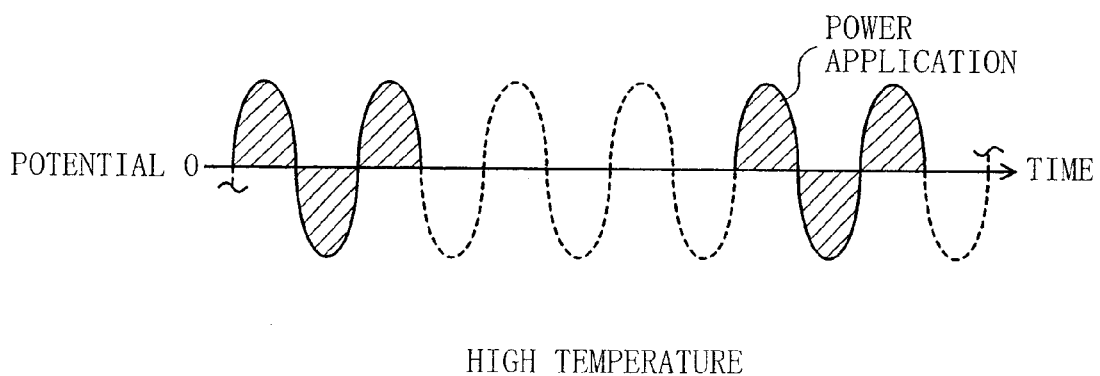

Namely, as illustrated in FIG. 13(a), the zero cross control unit sets the number of power-ons higher than the number of power-offs, for example, if the heater $R_{R1}$ is lower than the target resistance $R_{s1}$ and the temperature of the first cartridge heater 146 is lower than the target temperature. In addition, it sets the number of power-ons equal to the number of power-offs if, for instance, the heater resistance $R_{R1}$ is essentially equal to the target resistance $R_{s1}$ and the temperature of the first cartridge heater 146 is essentially equal to the target temperature, as shown in FIG. 13(b). If the heater resistance $R_{R1}$ is higher than the target resistance $R_{s1}$ and the temperature of the first cartridge heater 146 is higher than the target temperature, it sets the number of power-ons smaller than the number of power-offs, for example, as shown in FIG. 13(c). Other structural features are identical to those assumed in the CVD device 100. By adopting this structure, in which the power supplied to the first cartridge heater 146 is turned on or off when the potential is at 0, noise in the power is less likely to occur. As a result, the stability in the temperature of the first cartridge heater 146 is improved.

Sixth Embodiment

Next, the sixth embodiment of the present invention is explained. This embodiment is characterized in that linear control (linear amplifier control) is implemented on the power applied to the various heaters. Again, an explanation is given in reference to the embodiment by focusing on the first heater control device 166 as a typical example. The first heater control device 166, in which the embodiment is adopted, is provided with a linear control unit (not shown) instead of the phase control unit 188. The linear control unit continuously controls the AC power applied to the first cartridge heater 146 so as to ensure that the heater resistance $R_{R1}$ that has been input conforms to the target resistance $R_{s1}$.

Figure 14A:
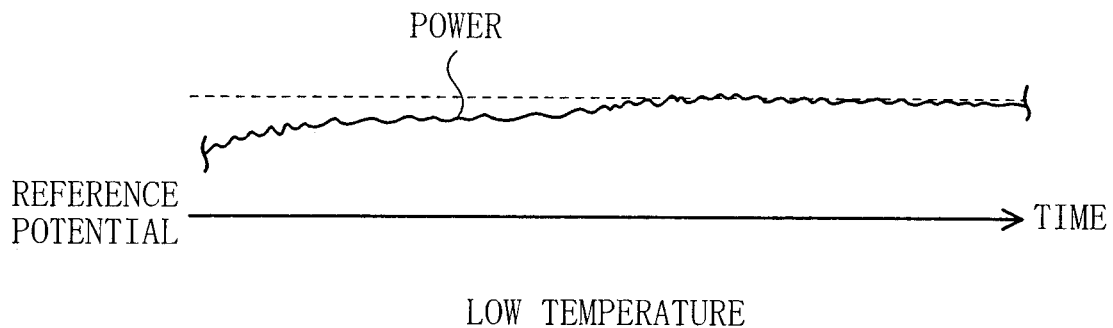
FIG. 14 schematically illustrates linear control implemented in another embodiment of the present invention.
Figure 14B:
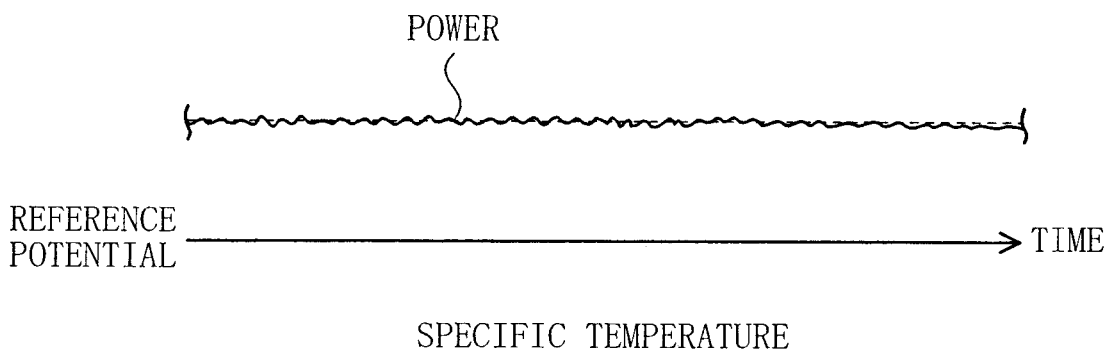
Figure 14C:
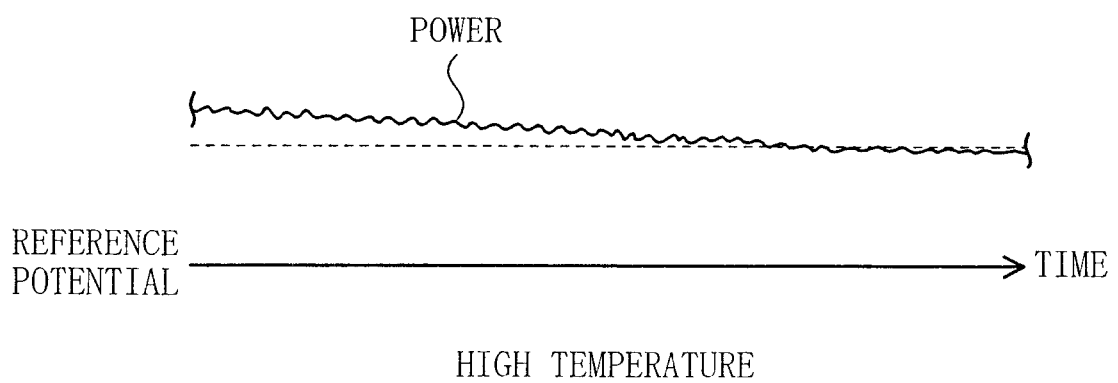

Namely, as illustrated in FIG. 14(a), the linear control unit continuously increases the power if the heater resistance $R_{R1}$ is lower than the target resistance $R_{s1}$ and the temperature of the first cartridge heater 146 is lower than the target temperature. Also, it sustains the power at a specific level if the heater resistance $R_{R1}$ is essentially equal to the target resistance $R_{s1}$ and the temperature of the first cartridge heater 146 is essentially equal to the target temperature, as shown in FIG. 14(b). If the heater resistance $R_{R1}$ is higher than the target resistance $R_{s1}$ and the temperature of the first cartridge heater 146 is higher than the target temperature, it decreases the power continuously, as shown in FIG. 14(c). Other structural features are identical to those assumed in the CVD device 100. By adopting this structure, in which the power applied to the first cartridge heater 146 is adjusted on a continuous basis, noise is reduced to achieve an improvement in the temperature control.

Seventh Embodiment

The seventh embodiment of the present invention is now explained. An explanation is given above in reference to the first sixth embodiments on an example in which the temperatures at all locations including the wall of the process chamber 102 and the evacuating pipe 145 are sustained essentially at the same level. However, the present invention is not restricted to such particulars, and may be adopted when the temperatures at a plurality of specific positions of the object to be heated are to be sustained at different levels. The present invention adopted in such an application is explained by focusing on the temperature control implemented on the mantle heater 260 which heats the evacuating pipe 145 as explained earlier in reference to the third embodiment.

In the CVD device 100 shown in FIG. 1, the gas evacuated from the process chamber 102 is allowed to pass through the evacuating pipe 145 in a gaseous state, and the gas which is then cooled in the trap 258 and becomes liquefiable is collected. In addition, the gas which is evacuated as described above contains $TiCl_{s4}$ and $NH_3$. The boiling point of $TiCl_4$ is 136.4° C., whereas the boiling point of $NH_3$ is −33.4° C. Thus, assuming that the evacuated gas contains only $TiCl_{s4}$ and $NH_3$, the evacuating pipe 145 only needs to be heated to a temperature equal to or higher than 136.4° C., i.e., the boiling point of $TiCl_4$. The temperature at the wall of the process chamber 102 is sustained at 150° C. Accordingly, in this embodiment, the temperature of the evacuating pipe 145 toward the process chamber 102 is sustained at 150° C., for instance, to ensure that the temperature at the wall of the process chamber 102 does not become lower, as in the embodiments explained earlier. However, unlike in the previous embodiment, the temperature of the evacuating pipe 145 toward the trap 258 is sustained at 137° C., for instance, so that $TiCl_4$ having a higher boiling point passes through the evacuating pipe 145 while remaining in a gaseous state to be promptly liquefied inside the trap 258.

Accordingly, the set temperature for the temperature control device (not shown) of the heater controller 262 is first selected at, for instance, 137° C. The temperature control device then obtains a reference resistance in correspondence to the set temperature. In addition, the temperature control device corrects the reference resistance by using a correction value obtained based upon the temperature detected by the temperature sensor 264 as necessary to obtain a corrected reference resistance. The process explained thus far is identical to that in the previous embodiments.

In addition, the temperature control device calculates target resistances $R_{s1}$, $R_{s2}$ and $R_{s3}$ by multiplying the corrected reference resistance by temperature distribution constants $K_1$, $K_2$ and $K_3$ that determine the temperature distribution at the positions at which heat is applied by the first third mantle heaters 260a, 260b and 260c shown in FIG. 10 as explained earlier. However, in this embodiment, the temperature at the position where heat is applied by the first mantle heater 260a is sustained at 150° C. The temperature at the position where heat is applied by the third mantle heater 260c is sustained at 137° C. The temperature at the position where heat is applied by the second mantle heater 260b is sustained at a level within the range of 137° C. 150° C., e.g., 144° C. For this reason, the temperature distribution constants $K_1$, $K_2$ and $K_3$ are set at values which will create the temperature gradient described above at the individual positions of the evacuating pipe 145a in correspondence to a single set temperature at the temperature control device.

Namely, the temperature distribution constants $K_1$, $K_2$ and $K_3$ are determined as described below. First, a temperature sensor is provided at each of the positions at which heat is applied by the first third mantle heaters 260a, 260b and 260c. Next, the temperatures of the first third mantle heaters 260a, 260b and 260c are controlled independently of one another, by the first third heater control devices (not shown) of the heater controller 262. Through this control, heat is applied at the different positions by the first~third mantle heaters 260a, 260b and 260c to sustain the temperatures at the different levels explained earlier. During this process, the temperatures at the different positions are monitored by the corresponding temperature sensors. When the temperatures at the various positions have become stabilized, the actual resistances at the first~third mantle heaters 260a, 260b and 260c are recorded.

Next, the temperature distribution constants $K_1$, $K_2$ and $K_3$ are ascertained in correspondence to the actual resistances that have been recorded. First, 1 is set for the temperature distribution constant $K_3$ at the position where the evacuating pipe 145a is heated by the third mantle heater 260c to the lowest level, for instance. This heat application position is also the position at which the temperature has been detected by the temperature sensor 264. In addition, the temperature distribution constant $K_1$ corresponding to the position at which heat is applied by the first mantle heater 260a and the temperature distribution constant $K_2$ corresponding to the position at which heat is applied by the second mantle heater 260b are calculated so that different temperature distributions are achieved at the individual heat application positions as explained earlier, relative to the heat distribution constant $K_3$. At the heat application positions corresponding to the temperature distribution constants $K_1$ and $K_2$, the temperatures have been detected by the corresponding temperature sensors other than the temperature sensor 264. As a result, the temperature distribution constants $K_1$, $K_2$ and $K_3$ achieve a relationship expressed as;

$$K_1 > K_2 > K_3.$$

To explain the control achieved by the heater controller 262 in further detail, the temperature control device multiplies the corrected reference resistance by the temperature distribution constants $K_1$, $K_2$ and $K_3$ and obtains target resistance values $R_{s1}$, $R_{s2}$ and $R_3$. Then, the first third heater control devices implement temperature control on the first third mantle heaters 260a, 260b and 260c based upon the actual resistances at the first third mantle heaters 260a, 260b and 260c and the target resistances. Other structural features are identical to those assumed in the heater controller 160 explained earlier. By using the target resistances $R_{s1}$, $R_{s2}$ and $R_{s3}$ in the temperature control described above, the temperatures at the individual heat application positions can be sustained at different levels in correspondence to a single set temperature. Thus, it is not necessary to set different temperatures at the temperature control device for the individual heat application positions at which heat is applied by the first~third mantle heaters 260a, 260b and 260c. It is to be noted that the embodiment may be adopted in temperature control on the resistance heater 112, the mantle heaters 140 and 144, the first~fourth cartridge heaters 146, 148, 150 and 152 and other heaters, as well. In addition, the embodiment may be adopted in the voltage control explained earlier in reference to the fourth embodiment, as well.

While the invention has been particularly shown and described with respect to preferred embodiments thereof by referring to the attached drawings, the present invention is not limited to these examples and it will be understood by those skilled in the art that various changes in form and detail may be made therein without departing from the spirit, scope and teaching of the invention.

For instance, while an explanation is given above in reference to the embodiments on an example in which the heating elements of the heaters are constituted of an Fe-Ni alloy, the present invention is not restricted to these particulars and it may be adopted in conjunction with heating elements constituted of any of various materials whose resistances change greatly in correspondence to the temperature.

In addition, while an explanation is given above in reference to the embodiments on an example in which the power to each heater is controlled so as to ensure that the heater resistance conforms to the target resistance even when the temperature of the member to be heated has not yet reached the set temperature immediately after startup or the like of the apparatus, the present invention is not restricted to these details. The present invention may be adopted when rapidly heating the member to be heated to the set temperature by supplying excessive power to the individual heaters. Even in such a case, since a resister whose resistance increases as the temperature rises to result in a reduction in the current value is employed in each heater, no damage occurs.

Furthermore, while an explanation is given above in reference to the embodiments on an example in which heaters and heater controllers that may adopt the present invention are utilized to heat various members constituting a thermal CVD device and various members connected to the thermal CVD device, the present invention is not restricted to these particulars, and it may be adopted in various types of semiconductor manufacturing apparatuses including plasma processing apparatuses such as a plasma CVD apparatus, a plasma etching apparatus and a plasma ashing apparatus and in various apparatuses and members that need to be heated.

According to the present invention, temperature control is implemented on a plurality of means for heating based upon the resistances at the individual means for heating or the voltages applied to the individual means for heating. Thus, the need for providing a means for temperature detection, a means for overheat detection or the like for each means for heating is eliminated. Furthermore, since the number of wirings to be connected to the individual means for temperature detection is also reduced, the structure of the apparatus is simplified. Thus, the initial cost is minimized, the maintenance work on the means for heating and the temperature controllers is facilitated and miniaturization of the apparatus is achieved. Moreover, the temperatures of the means for heating are directly measured according to the present invention. The temperature control on all the means for heating is implemented as a whole based upon the temperatures detected by the means for temperature detection. Consequently, a higher degree of accuracy is achieved in the temperature management. In addition, even when a single member is heated with a plurality of means for heating, temperature control is implemented on the individual means for heating as a whole. As a result, the individual means for heating do not interfere with one another, to achieve even heating.

INDUSTRIAL APPLICABILITY

The present invention may be adopted in various types of semiconductor manufacturing apparatuses including a thermal CVD device and plasma processing apparatuses such as a plasma CVD devices, a plasma etching apparatus and a plasma ashing apparatus, and also in the various apparatuses and members that need to be heated.

Explanation of Reference Numerals

100 CVD device
102 process chamber
106 stage
108 gas outlet member
110, 138, 142, 160, 262 heater controller
112 resistance heater
140, 144, 260 mantle heater
146, 148, 150, 152 first~fourth cartridge heaters
156 heating wire
164 temperature control device
166, 168, 170,172 first~fourth heater control devices
174 heater control unit
175 interlock control unit
176 voltage sensor
178 current sensor
184 arithmetic unit
190 phase control unit
250 temperature sensor
W wafer

What is claimed is:

1. A temperature control apparatus for implementing temperature control on a means for heating that heats an object to be heated, comprising;

at least two means for heating each with a resistance that increases as the temperature rises;

at least one means for temperature detection that detects the temperature of the object to be heated;

a means for target resistance calculation that calculates a target resistance for each of said means for heating by correcting a reference resistance determined based upon a set temperature for the object to be heated with a correction value obtained in correspondence to the temperature detected by said means for temperature detection and multiplying the corrected reference resistance by a temperature distribution constant that is determined in advance for each of said means for heating to adjust the temperature distribution at the object to be heated;

a means for actual resistance calculation that calculates an actual resistance at each of said means for heating based upon a feedback voltage value obtained based upon the voltage applied to said means for heating and a feedback current value obtained based upon the current flowing through said means for heating; and a means for power control that controls the power applied to each of said means for heating so that the actual resistance at said means for heating conforms to the target resistance.

2. A temperature control apparatus for implementing temperature control on a means for heating according to claim 1, wherein;

said means for power control is a means for phase control that implements phase control on the power applied to each of said means for heating.

3. A temperature control apparatus for implementing temperature control on a means for heating according to claim 2, wherein;

said means for phase control increases the length of time over which power is applied if the actual resistance is lower than the target resistance;

said means for phase control sustains the current length of time over which power is applied if the actual resistance is equal to the target resistance; and said means for phase control reduces the length of time over which power is applied if the actual resistance is higher than the target resistance.

4. A temperature control apparatus for implementing temperature control on a means for heating according to claim 1, wherein;

said means for power control is a means for zero cross control that implements zero cross control on the power applied to each of said means for heating.

5. A temperature control apparatus for implementing temperature control on a means for heating according to claim 1, wherein;

said means for power control is a means for linear control that implements linear control on the power applied to each of said means for heating.

6. A temperature control apparatus for implementing temperature control on a means for heating according to claim 1, wherein;

a means for power supply suspension that suspends power supply to said means for heating if the actual resistance becomes higher than a resistance upper limit or becomes lower than a resistance lower limit.

7. A temperature control apparatus for implementing temperature control on a means for heating according to claim 1, wherein;

the object to be heated is a member constituting said semiconductor manufacturing apparatus and the like.

8. A temperature control apparatus for implementing temperature control on a means for heating that heats an object to be heated, comprising;

at least two means for heating each with a resistance value increasing as the temperature rises;

at least one means for temperature detection that detects the temperature of the object to be heated;

a means for target voltage calculation that calculates a target voltage for each of said means for heating by correcting a reference voltage determined based upon the set temperature for the object to be heated with a correction value obtained in correspondence to the temperature detected by said means for temperature detection and multiplying the corrected reference voltage by a temperature distribution constant that is determined in advance for each of said means for heating to adjust the temperature distribution at the object to be heated;

a means for voltage detection that detects an actual voltage applied to each of said means for heating; and a means for power control that controls the power applied to each of said means for heating so that the actual voltage at said means for heating conforms to the target voltage.

9. A temperature control apparatus for implementing temperature control on a means for heating according to claim 8, wherein;

said means for power control is a means for phase control that implements phase control on the power applied to each of said means for heating.

10. A temperature control apparatus for implementing temperature control on a means for heating according to claim 9, wherein;

said means for phase control increases the length of time over which power is applied if the actual voltage is lower than the target voltage;

said means for phase control sustains the current length of power application if the actual voltage is essentially equal to the target voltage; and said means for phase control reduces the length of time over which power is applied if the actual voltage is higher than the target voltage.

11. A temperature control apparatus for implementing temperature control on a means for heating according to claim 8, wherein;

said means for power control is a means for zero cross control that implements zero cross control on the power applied to each of said means for heating.

12. A temperature control apparatus for implementing temperature control on a means for heating according to claim 8, wherein;

said means for power control is a means for linear control that implements linear control on the power applied to each of said means for heating.

13. A temperature control apparatus for implementing temperature control on a means for heating according to claim 8, wherein;

a means for power supply suspension that suspends the power supply to said means for heating if the actual voltage becomes higher than a voltage upper limit or becomes lower than a voltage lower limit.

14. A temperature control apparatus for implementing temperature control on a means for heating according to claim 8, wherein;

the object to be heated is a member constituting said semiconductor manufacturing apparatus and the like.

15. A temperature control method for implementing temperature control on a means for heating that heats an object to be heated, comprising;

a step in which a reference resistance determined based upon the set temperature for the object to be heated is corrected by using a correction value obtained in correspondence to the temperature of the object to be heated detected by, at least, one means for temperature detection;

a step in which the corrected reference resistance is multiplied by a temperature distribution constant used to adjust the temperature distribution at the object to be heated, which is determined in advance for each of at least two means for heating each with a resistance that increases in correspondence to a temperature increase to obtain a target resistance for each of said means for heating;

a step in which the actual resistance at each of said means for heating is ascertained based upon a feedback voltage which corresponds to the voltage applied to said means for heating and a feedback current which corresponds to the current flowing through said means for heating; and a step in which the power applied to each of said means for heating is controlled so that the actual resistance at said means for heating conforms to the target resistance.

16. A temperature control method for implementing temperature control on a means for heating according to claim 15, wherein;

in said step for power control, phase control is implemented on the power applied to each of said means for heating.

17. A temperature control method for implementing temperature control on a means for heating according to claim 16, wherein;

said step for implementing phase control includes;

a step in which the length of time over which power is applied is increased if the actual resistance is lower than the target resistance;

a step in which the current length of power application time is sustained if the actual resistance is essentially equal to the target resistance; and a step in which the length of time over which power is applied is reduced if the actual resistance is higher than the target resistance.

18. A temperature control method for implementing temperature control on a means for heating according to claim 15, wherein;

in said step for power control, zero cross control is implemented on the power applied to each of said means for heating.

19. A temperature control method for implementing temperature control on a means for heating according to claim 15, wherein;

in said step for power control, linear control is implemented on the power applied to each of said means for heating.

20. A temperature control method for implementing temperature control on a means for heating according to claim 15, further comprising;

a step in which power supply to said means for heating is suspended if the actual resistance becomes higher than a resistance upper limit or the actual resistance becomes lower than a resistance lower limit.

21. A temperature control method for implementing temperature control on a means for heating according to claim 15, wherein;

the object to be heated is a member constituting said semiconductor manufacturing apparatus and the like.

22. A temperature control method for implementing temperature control on a means for heating that heats an object to be heated, comprising;

a step in which a reference voltage determined based upon the set temperature for the object to be heated is corrected by using a correction value obtained in correspondence to the temperature of the object to be heated detected by, at least, one means for temperature detection;

a step in which the corrected reference voltage is multiplied by a temperature distribution constant used to adjust the temperature distribution at the object to be heated, which is determined in advance for each of at least two means for heating each with a resistance that increases in correspondence to a temperature increase to obtain a target voltage for each of said means for heating;

a step in which the actual voltage applied to each of said means for heating is detected; and a step in which the power applied to each of said means for heating is controlled so that the actual voltage at said means for heating conforms to the target voltage.

23. A temperature control method for implementing temperature control on a means for heating according to claim 23, wherein;

in said step for power control, phase control is implemented on the power applied to each of said means for heating.

24. A temperature control method for implementing temperature control on a means for heating according to claim 23, wherein;

said step for implementing phase control includes;

a step in which the length of time over which power is applied is increased if the actual voltage is lower than the target voltage;

a step in which the current length of power application time is sustained if the actual voltage is essentially equal to the target voltage; and a step in which the length of time over which power is applied is reduced if the actual voltage is higher than the target voltage.

25. A temperature control method for implementing temperature control on a means for heating according to claim 22, wherein;

in said step for power control, zero cross control is implemented on the power applied to each of said means for heating.

26. A temperature control method for implementing temperature control on a means for heating according to claim 22, wherein;

in said step for power control, linear control is implemented on the power applied to each of said means for heating.

27. A temperature control method for implementing temperature control on a means for heating according to claim 22, further comprising;

a step in which power supply to said means for heating is suspended if the actual voltage becomes higher than a voltage upper limit or the actual voltage becomes lower than a voltage lower limit.

28. A temperature control method for implementing temperature control on a means for heating according to claim 22, wherein;

the object to be heated is a member constituting said semiconductor manufacturing apparatus and the like.

* * * * *